(12) United States Patent
Kwon et al.

(10) Patent No.: US 11,790,858 B2
(45) Date of Patent: Oct. 17, 2023

(54) DISPLAY DEVICE AND DRIVING METHOD THEREOF

(71) Applicant: Samsung Display Co., Ltd., Yongin-Si (KR)

(72) Inventors: Sangan Kwon, Cheonan-si (KR); Soon-Dong Kim, Osan-si (KR); Taehoon Kim, Hwaseong-si (KR); Hui Nam, Suwon-si (KR); Junhee Moon, Suwon-si (KR); Eun Sil Yun, Hwaseong-si (KR); Changnoh Yoon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/994,419

(22) Filed: Nov. 28, 2022

(65) Prior Publication Data

US 2023/0086572 A1 Mar. 23, 2023

Related U.S. Application Data

(63) Continuation of application No. 17/358,083, filed on Jun. 25, 2021, now Pat. No. 11,514,866.

(30) Foreign Application Priority Data

Nov. 5, 2020 (KR) .................. 10-2020-0147047

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2300/0842* (2013.01);
(Continued)

(58) Field of Classification Search
None
See application file for complete search history.

(56) References Cited

U.S. PATENT DOCUMENTS 9,293,106 B2 3/2016 Hong et al.
2010/0085386 A1 4/2010 Lin et al.
(Continued)

FOREIGN PATENT DOCUMENTS

KR 10-0923347 B1 10/2009
KR 10-2018-0018888 A 2/2018
KR 10-2060627 B1 12/2019

*Primary Examiner* — Nitin Patel
*Assistant Examiner* — Amen W Bogale
(74) *Attorney, Agent, or Firm* — Innovation Counsel LLP

(57) ABSTRACT

Provided is a display device. The display device includes a display panel that includes a first display region and a second display region, a data driving circuit configured to drive a plurality of data lines, a scan driving circuit configured to drive a plurality of scan lines, and a driving controller configured to control the data driving circuit and the scan driving circuit so as to operate the first display region and the second display region at different frequencies when an operation mode is a multi-frequency mode, wherein the driving controller changes the operation mode to a normal mode when a difference between an image signal of a current frame of the first display region and an image signal of a previous frame of the first display region is equal to or greater than a reference value during the multi-frequency mode.

20 Claims, 14 Drawing Sheets

(52) U.S. Cl.
CPC ............... *G09G 2310/0278* (2013.01); *G09G 2320/0233* (2013.01)

(56) References Cited

U.S. PATENT DOCUMENTS

| | | | |
|---|---|---|---|
| 2011/0050758 A1* | 3/2011 | Chao | G09G 3/3611 345/694 |
| 2011/0084971 A1* | 4/2011 | Kuo | G06F 3/14 345/501 |
| 2011/0169800 A1* | 7/2011 | Jun | G09G 3/3666 345/211 |
| 2012/0127191 A1 | 5/2012 | Choi et al. | |
| 2014/0085276 A1 | 3/2014 | Jang et al. | |
| 2018/0047335 A1 | 2/2018 | Hwang et al. | |
| 2019/0172398 A1 | 6/2019 | Shin et al. | |

* cited by examiner

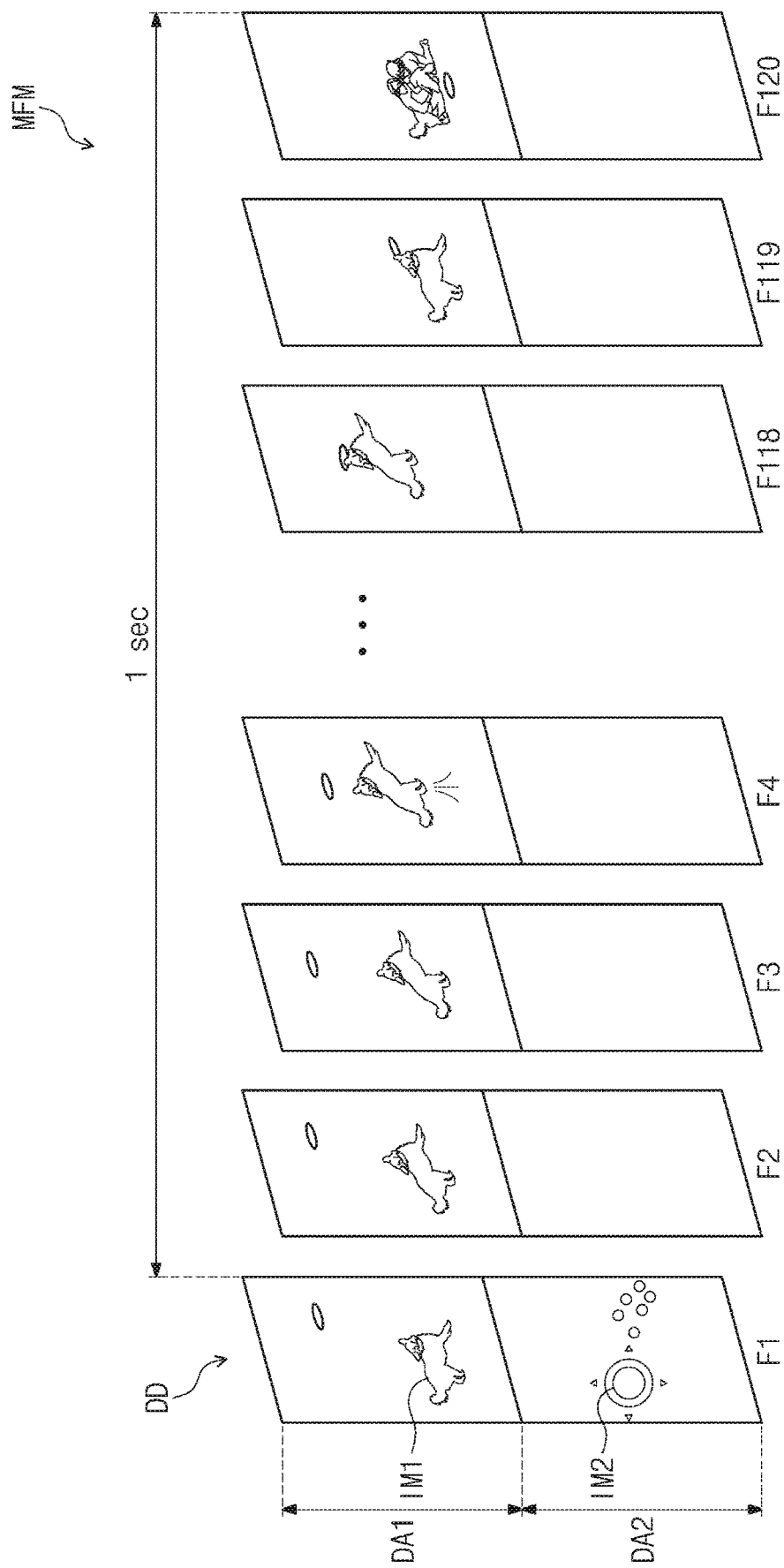

DISPLAY DEVICE AND DRIVING METHOD THEREOF

CROSS-REFERENCE TO RELATED APPLICATIONS

This application is a continuation application of U.S. patent application Ser. No. 17/358,083 filed on Jun. 25, 2021, which claims priority under 35 USC § 119 to Korean Patent Application No. 10-2020-0147047, filed on Nov. 5, 2020, the entire contents of which are hereby incorporated by reference.

BACKGROUND

The present disclosure herein relates to a display device.

Organic light-emitting diode display devices among various display devices display images using an organic light-emitting diode which generates light through recombination of electrons and holes. Such organic light-emitting diode display devices are operated at low power while having a fast response time.

Organic light-emitting diode display devices are provided with pixels connected to data lines and scan lines. In general, pixels include an organic light-emitting diode and a circuit part for controlling the amount of current flowing to the organic light-emitting diode. The circuit part controls the amount of current flowing from a first driving voltage to a second driving voltage via an organic light-emitting diode in response to a data signal. Here, light of predetermined brightness is generated according to the amount of current flowing through the organic light-emitting diode.

Since the fields of application of display devices have been recently broadened, a plurality of different images may be displayed on a single display device. It is required to develop a technology for preventing display quality deterioration of a display device when displays a plurality of images, while reducing power consumption of the display device.

SUMMARY

The present disclosure provides a display device capable of reducing power consumption and preventing deterioration of display quality and a driving method thereof.

An embodiment of the inventive concept provides a display device including a display panel including a first display region and a second display region, each of the first display region and the second display region including a plurality of pixels connected to a plurality of data lines and a plurality of scan lines, a data driving circuit configured to drive the plurality of data lines, a scan driving circuit configured to drive the plurality of scan lines, and a driving controller configured to control the data driving circuit and the scan driving circuit so as to operate the first display region and the second display region at different frequencies when an operation mode is a multi-frequency mode. In an embodiment, the driving controller may change the operation mode to a normal mode when a difference between an image signal of a current frame of the first display region and an image signal of a previous frame of the first display region is equal to or greater than a reference value during the multi-frequency mode.

In an embodiment, the driving controller may include a frequency mode determination part configured to determine the operation mode based on the image signal of the current frame, the image signal of the previous frame, and a control signal, and output a mode signal, and a signal generator configured to output an image data signal to the data driving circuit, a data control signal to the data driving circuit and a scan control signal to the scan driving circuit corresponding to the mode signal.

In an embodiment, the driving controller may further include a memory configured to store the image signal of the current frame and output the image signal of the previous frame.

In an embodiment, the signal generator may include a lookup table configured to store a compensation value, and a compensator configured to read a compensation value corresponding to the difference between the image signal of the current frame and the image signal of the previous frame from the lookup table.

In an embodiment, when the mode signal indicates the normal mode, the compensator may read the compensation value corresponding to the difference between the image signal of the current frame corresponding to an entirety of the display panel and the image signal of the previous frame corresponding to the entirety of the display panel from the lookup table and output the image data signal.

In an embodiment, when the mode signal indicates the multi-frequency mode and the current frame is a frame in which images are displayed both in the first display region and in the second display region, the compensator may read the compensation value corresponding to the difference value between the image signal of the current frame corresponding to an entirety of the display panel and the image signal of the previous frame corresponding to the entirety of the display panel from the lookup table, and output the image data signal.

In an embodiment, when the mode signal indicates the multi-frequency mode and the current frame is a frame in which images are displayed only in the first display region, the compensator may read the compensation value corresponding to the difference between the image signal of the current frame corresponding to the first display region and the image signal of the previous frame corresponding to the first display region from the lookup table, and output the image data signal.

In an embodiment, the driving controller may control the data driving circuit and the scan driving circuit so as to drive the first display region at a first driving frequency and drive the second display region at a second driving frequency lower than the first driving frequency during the multi-frequency mode.

In an embodiment, the driving controller may control the data driving circuit and the scan driving circuit so as to drive each of the first display region and the second display region at a normal frequency during the multi-frequency mode.

In an embodiment, the first driving frequency may be equal to or higher than the normal frequency and the second driving frequency may be lower than the normal frequency.

In an embodiment, the difference between the image signal of the current frame of the first display region and the image signal of the previous frame of the first display region may include at least one of a variation in a current flowing through a light-emitting diode, an on-pixel ratio (OPR) difference, a luminance difference, or a gradation difference between the image signal of the current frame and the image signal of the previous frame.

In an embodiment of the inventive concept, a display device includes a display panel including a first display region and a second display region, each of the first display region and the second display region including a plurality of pixels connected to a plurality of data lines and a plurality of scan lines, a data driving circuit configured to drive the plurality of data lines, a scan driving circuit configured to drive the plurality of scan lines, and a driving controller configured to control the data driving circuit and the scan driving circuit so as to operate the first display region at a first driving frequency and operate the second display region at a second driving frequency when an operation mode is a multi-frequency mode. In an embodiment, the driving controller may gradationally increase the second driving frequency according to a difference between an image signal of a current frame of the first display region and an image signal of a previous frame of the first display region during the multi-frequency mode.

In an embodiment, the driving controller may set the second driving frequency to a first frequency when the difference between the image signal of the current frame of the first display region and the image signal of the previous frame of the first display region is equal to or greater than a first reference value and is less than a second reference value, and wherein the driving controller sets the second driving frequency to a second frequency higher than the first frequency when the difference between the image signal of the current frame of the first display region and the image signal of the previous frame of the first display region is equal to or greater than the second reference value and is less than a third reference value.

In an embodiment, the driving controller may change the operation mode to a normal mode when the difference between the image signal of the current frame of the first display region and the image signal of the previous frame of the first display region is equal to or greater than the third reference value.

In an embodiment, the driving controller may include a frequency mode determination unit configured to determine the operation mode based on the image signal of the current frame, the image signal of the previous frame, and a control signal, and output a mode signal, and a signal generator configured to output an image data signal to the data driving circuit a data control signal to the data driving circuit and a scan control signal to the scan driving circuit corresponding to the mode signal.

In an embodiment, the driving controller may further include a memory configured to store the image signal of the current frame and output the image signal of the previous frame.

In an embodiment, the signal generator may include a lookup table configured to store a compensation value, and a compensator configured to read a compensation value corresponding to the difference value between the image signal of the current frame and the image signal of the previous frame from the lookup table.

In an embodiment of the inventive concept, a method of driving a display device includes dividing a display panel into a first display region and a second display region during a multi-frequency mode, and driving the first display region at a first driving frequency and driving the second display region at a second driving frequency, comparing a reference value with a difference between an image signal of a current frame of the first display region and an image signal of a previous frame of the first display region, and changing an operation mode to a normal mode when the difference is equal to or greater than the reference value.

In an embodiment, the difference between the image signal of the current frame of the first display region and the image signal of the previous frame of the first display region may include at least one of a variation in a current flowing through a light-emitting diode, an on-pixel ratio (OPR) difference, a luminance difference, or a gradation difference between the image signal of the current frame and the image signal of the previous frame.

In an embodiment, the comparing the reference with the difference value may include comparing the difference with a second reference value which is greater than the first reference value when the difference is equal to or greater than the first reference value, determining whether the current frame is a frame in which images are displayed only in the first display region when the difference is less than the second reference value, and changing the operation mode to a multi-frequency compensation mode when the current frame is the frame in which images are displayed only in the first display region.

In an embodiment, the second reference value may be equal to the reference value.

In an embodiment of the inventive concept, a method of driving a display device includes dividing a display panel into a first display region and a second display region during a multi-frequency mode, and driving the first display region at a first driving frequency and driving the second display region at a second driving frequency, setting the second driving frequency to a first frequency when a difference between an image signal of a current frame of the first display region and an image signal of a previous frame of the first display region is equal to or greater than a first reference value and is less than a second reference value, and setting the second driving frequency to a second frequency higher than the first frequency when the difference value between the image signal of the current frame of the first display region and the image signal of the previous frame of the first display region is equal to or greater than the second reference value and is less than a third reference value which is greater than the second reference value.

In an embodiment, the method may further include changing the operation mode to a normal mode when the difference between the image signal of the current frame of the first display region and the image signal of the previous frame of the first display region is equal to or greater than third reference value.

BRIEF DESCRIPTION OF THE FIGURES

The accompanying drawings are included to provide a further understanding of the inventive concept and are incorporated in and constitute a part of this specification. The drawings illustrate embodiments of the inventive concept and, together with the description, serve to explain principles of the inventive concept. In the drawings:

FIG. 3B is a diagram for describing operation of a display device at a multi-frequency mode;

DETAILED DESCRIPTION

Figure 1:
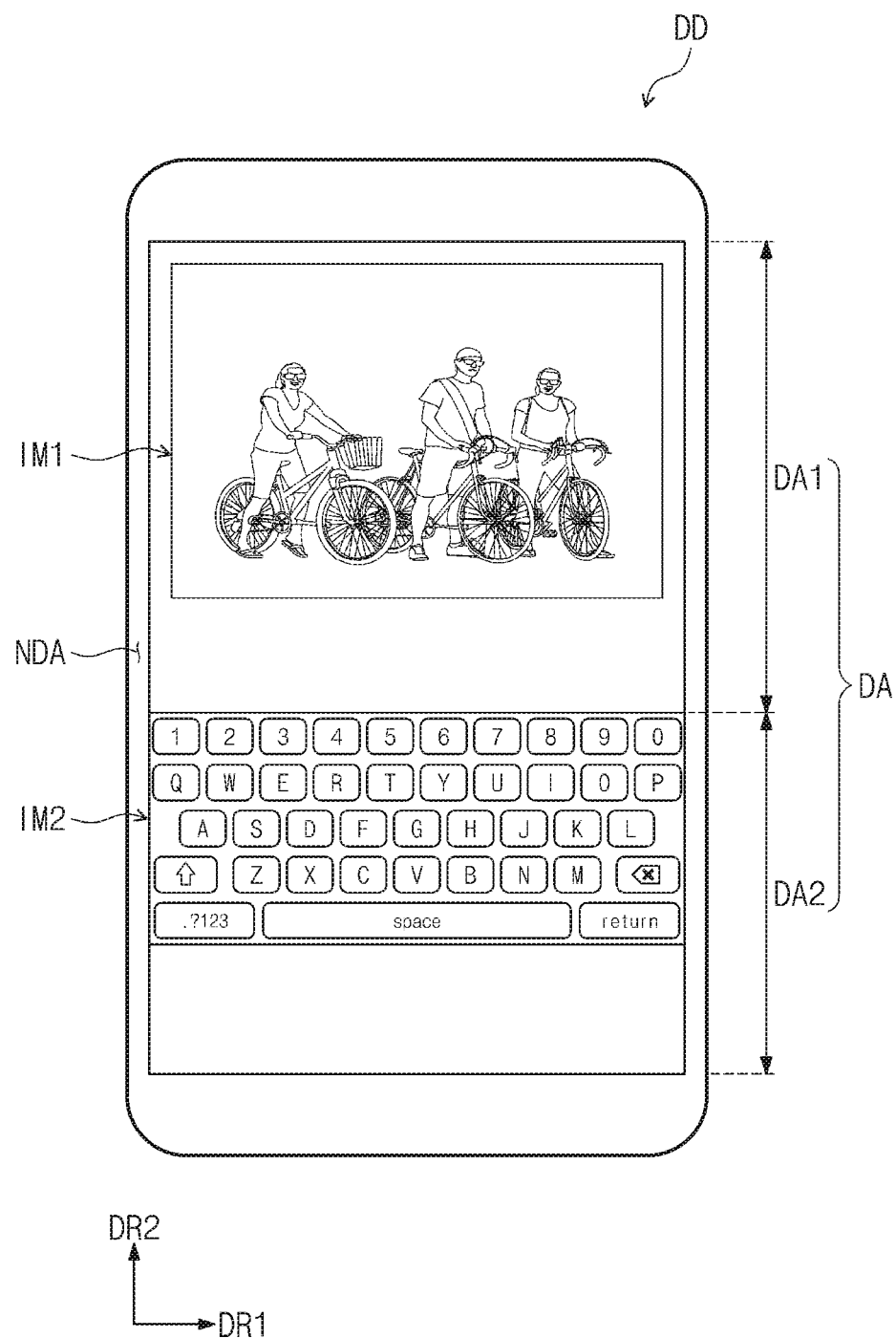
FIG. 1 is a perspective view illustrating a display device according to an embodiment of the inventive concept.

It will be understood that when an element (or a region, layer, portion, or the like) is referred to as being "on", "connected to", or "coupled to" another element, it can be directly on or directly connected/coupled to the other element, or a third element may be present therebetween.

The same reference numerals refer to the same elements. As used herein, the term "and/or" includes any combinations that can be defined by associated elements.

The terms "first", "second" and the like may be used for describing various elements, but the elements should not be construed as being limited by the terms. Such terms are only used for distinguishing one element from other elements. For example, a first element could be termed a second element and vice versa without departing from the teachings of the present disclosure. The terms of a singular form may include plural forms unless otherwise specified.

Furthermore, the terms "under", "lower side", "on", "upper side", and the like are used to describe association relationships among elements illustrated in the drawings. The terms, which are relative concepts, are used on the basis of directions illustrated in the drawings.

It will be further understood that the terms "include", "including", "has", "having", and the like, when used in this specification, specify the presence of stated features, numbers, steps, operations, elements, components, or combinations thereof, but do not preclude the presence or addition of one or more other features, numbers, steps, operations, elements, components, or combinations thereof.

All of the terms used herein (including technical and scientific terms) have the same meanings as understood by those skilled in the art, unless otherwise defined. Terms in common usage such as those defined in commonly used dictionaries should be interpreted to contextually match the meanings in the relevant art and are explicitly defined herein unless interpreted in an idealized or overly formal sense.

Hereinafter, embodiments of the inventive concept will be described in detail with reference to the accompanying drawings.

FIG. 1 is a perspective view illustrating a display device according to an embodiment of the inventive concept.

FIG. 1 illustrates a portable terminal as an example of a display device DD according to an embodiment of the inventive concept. The portable terminal may include a tablet PC, a smartphone, a personal digital assistant (PDA), a portable multimedia player (PMP), a game machine, a wrist watch-type electronic device, etc. However, an embodiment of the inventive concept is not limited thereto.

An embodiment of the inventive concept may be used not only in large-size electronic devices such as an outdoor billboard but also in small- and medium-size electronic devices such as a personal computer, a laptop computer, a kiosk, a vehicle navigation unit, and a camera. However, these devices are merely examples, and thus an embodiment of the inventive concept may be applied to other electronic devices without departing from the inventive concept.

As illustrated in FIG. 1, a display surface on which a first image IM1 and a second image IM2 are displayed is parallel to a surface defined by the first direction DR1 and a second direction DR2. The display device DD includes a plurality of regions divided on the display surface. The display surface includes a display region DA in which the first image IM1 and the second image IM2 are displayed and a non-display region NDA adjacent to the display region DA. The non-display region NDA may be referred to as a bezel region. For example, the display region DA may be rectangular. The non-display region NDA surrounds the display region DA. Although not illustrated, for example, the display device DD may include a partially curved shape. As a result, one region of the display region DA may have a curved shape.

The display region DA of the display device DD includes a first display region DA1 and a second display region DA2. In a specific application program, the first image IM1 may be displayed in the first display region DA1 and the second image IM2 may be displayed in the second display region DA2. For example, the first image IM1 may be a moving image and the second image IM2 may be a still image or text information which is not changed frequently.

The display device DD according to an embodiment may drive the first display region DA1, in which a moving image is displayed, at a normal frequency or a frequency higher than the normal frequency, and drive the second display region DA2, in which a still image is displayed, at a frequency lower than the normal frequency. The display device DD may reduce power consumption by decreasing a driving frequency of the second display region DA2.

Sizes of the first display region DA1 and the second display region DA2 may be preset and may be changed by an application program. In an embodiment, when the first display region DA1 displays a still image and the second display region DA2 displays a moving image, the first display region DA1 may be driven at a frequency lower than the normal frequency and the second display region DA2 may be driven at the normal frequency or a frequency higher than the normal frequency. Furthermore, the display region DA may be divided into three or more display regions and a driving frequency of each of the display regions may be determined according to the type of an image (still image or moving image) displayed in each of the display regions.

Figure 2A:
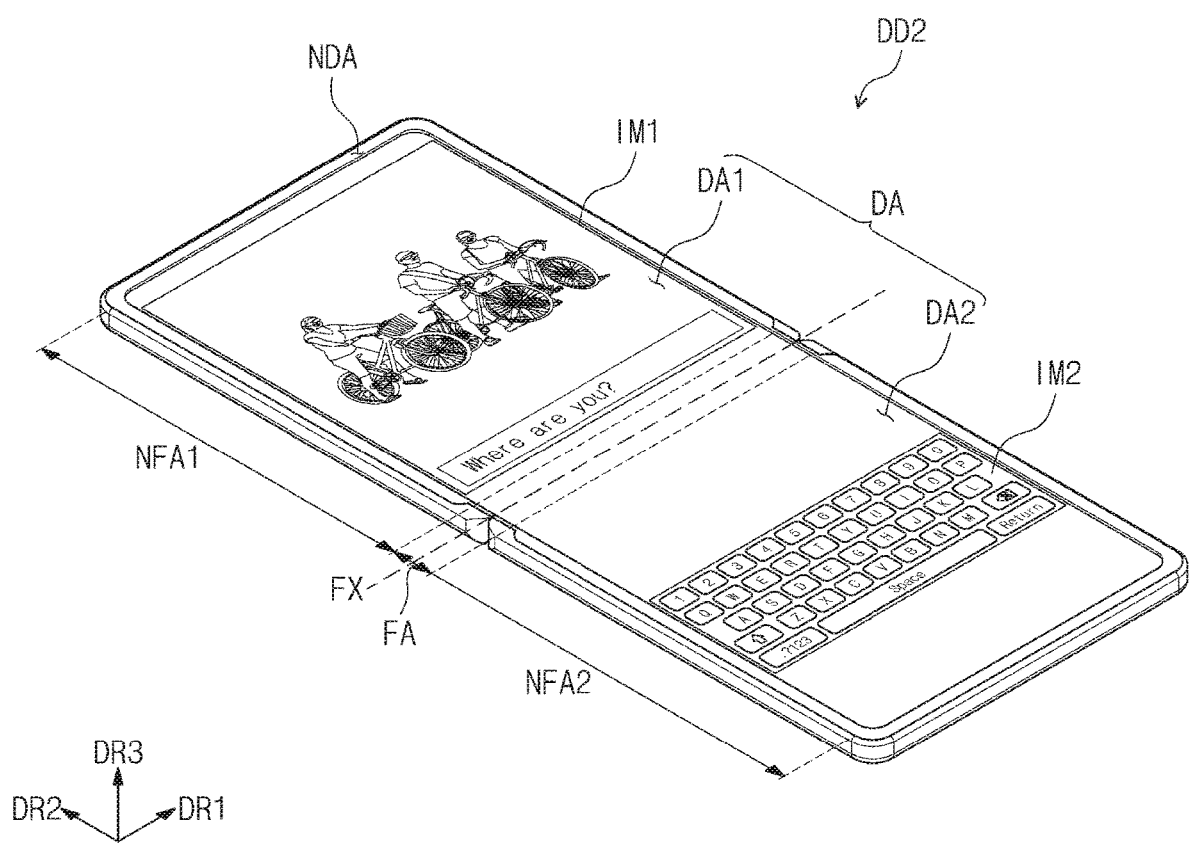
FIGS. 2A and 2B are perspective views illustrating a display device according to an embodiment of the inventive concept.
Figure 2B:
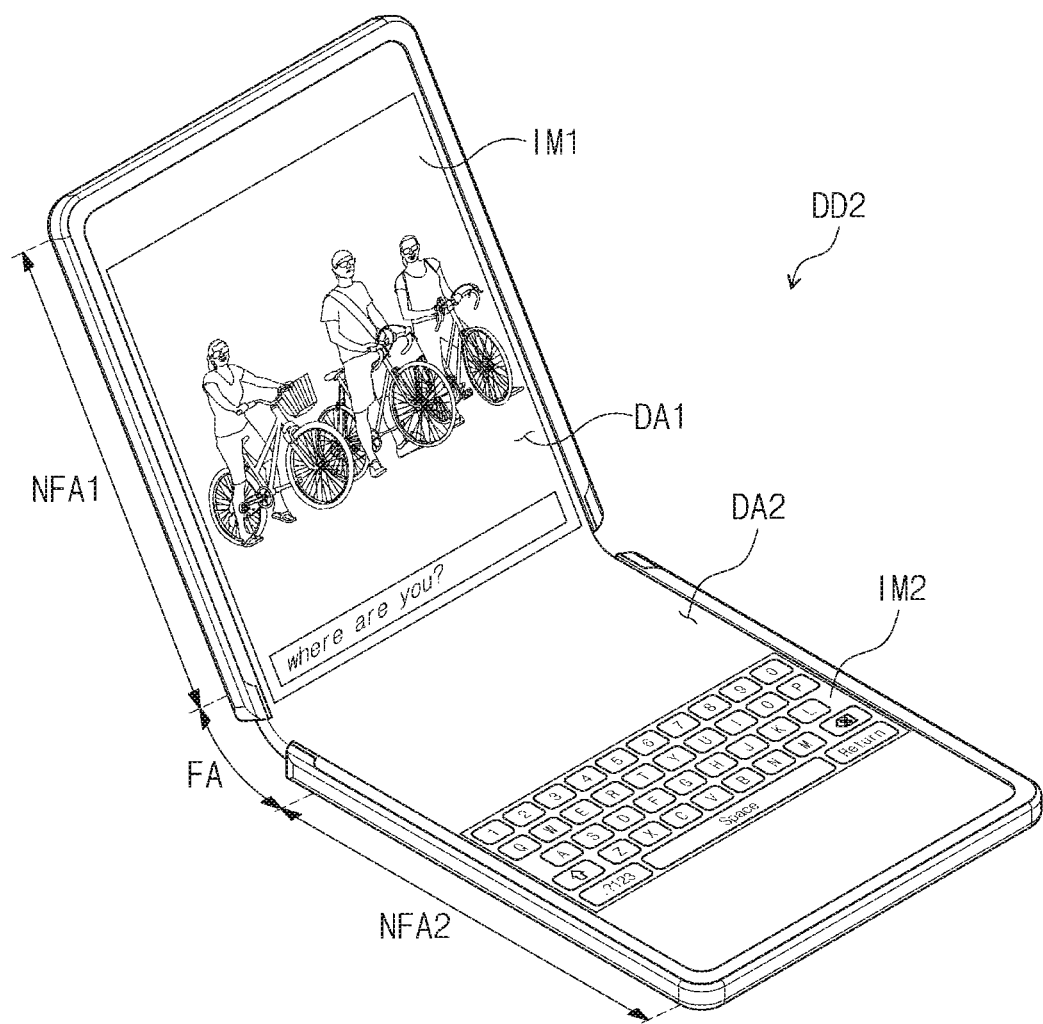

FIGS. 2A and 2B are perspective views illustrating a display device DD2 according to an embodiment of the inventive concept. FIG. 2A illustrates an unfolded state of the display device DD2 and FIG. 2B illustrates a folded state of the display device DD2.

As illustrated in FIGS. 2A and 2B, the display device DD2 includes the display region DA and the non-display region NDA. The display region DD2 may display an image through the display region DA. When the display device DD2 is unfolded, the display region DA may include a plane defined by the first direction DR1 and the second direction DR2. A thickness direction of the display device DD2 may be parallel with a third direction DR3 intersecting a plane defined by the first direction DR1 and the second direction DR2. Therefore, front surfaces (or top surfaces) and rear surfaces (or bottom surfaces) of members constituting the display device DD2 may be defined based on the third direction DR3. The non-display region NDA may be referred to as a bezel region. For example, the display region DA may be rectangular. The non-display region NDA surrounds the display region DA.

The display region DA may include a first non-folding region NFA1, a folding region FA, and a second non-folding region NFA2. The folding region FA may be bent with respect to a folding axis FX extending in the first direction DR1.

When the display device DD2 is folded, the first non-folding region NFA1 and the second non-folding region NFA2 may face each other. Therefore, in a state in which the display device DD2 is completely folded, the display region DA may not be exposed to the outside, and this state may be referred to as in-folding state. However, this is merely an example, and configuration of the electronic device DD2 is not limited thereto.

For example, in an embodiment of the inventive concept, when the display device DD2 is folded, the first non-folding region NFA1 and the second non-folding region NFA2 may oppose each other. Therefore, in a folded state, the first non-folding region NFA1 and the second non-folding region NFA2 may be exposed to the outside, and this state may be referred to as out-folding state.

The display device DD2 may be capable of performing only one of an in-folding motion and an out-folding motion. Alternatively, the display region DD2 may be capable of performing both an in-folding motion and an out-folding motion. In this case, the same region in the display device DD2, for example, the folding region FA, may be in-folded and out-folded. Alternatively, a partial region of the display device DD2 may be in-folded and another partial region may be out-folded.

Although FIGS. 2A and 2B illustrate one folding region and two non-folding regions, the number of folding regions and the number of non-folding regions are not limited thereto. For example, the display device DD2 may include more than two non-folding regions and a plurality of folding regions arranged between adjacent non-folding regions.

Although FIGS. 2A and 2B illustrate the folding axis FX as being parallel with a minor axis of the display device DD2, an embodiment of the inventive concept is not limited thereto. For example, the folding axis FX may extend in a direction parallel to a major axis of the display device DD2, for example, the second direction DR2.

Although FIGS. 2A and 2B illustrate that the first non-folding region NFA1, the folding region FA, and the second non-folding region NFA2 are sequentially arranged in the second direction DR2, however, embodiment of the inventive concept is not limited thereto. For example, the first non-folding region NFA1, the folding region FA, and the second non-folding region NFA2 may be sequentially arranged in the first direction DR1.

The plurality of display regions DA1 and DA2 may be defined in the display region DA of the display device DD2. Although FIG. 2A illustrates two display regions DA1 and DA2, the number of the plurality of display regions DA1 and DA2 is not limited thereto.

The plurality of display regions DA1 and DA2 may include a first display region DA1 and a second display region DA2. For example, the first display region DA1 may be a region in which the first image IM1 is displayed and the second display region DA2 may be a region in which the second image IM2 is displayed, but an embodiment of the inventive concept is not limited thereto. For example, the first image IM1 may be a moving image and the second image IM2 may be a still image or an image (text information or the like) which is not changed frequently.

The display device DD2 according to an embodiment may differently operate according to an operation mode. The operation mode may include a normal mode and a multi-frequency mode. During the normal mode, the display device DD2 may drive both of the first display region DA1 and the second display region DA2 at a normal frequency. During the multi-frequency mode, the display device DD2 according to an embodiment may drive the first display region DA1, in which the first image IM1 is displayed, at a first driving frequency and drive the second display region DA2, in which the second image IM2 is displayed, at a second driving frequency lower than the normal frequency. In an embodiment, the first driving frequency may be equal to or higher than the normal frequency.

Sizes of the first display region DA1 and the second display region DA2 may be preset and may be changed by an application program. In an embodiment, the first display region DA1 may correspond to the first non-folding region NFA1, and the second display region DA2 may correspond to the second non-folding region NFA2. Furthermore, a first portion of the folding region FA may correspond to the first display region DA1, and a second portion of the folding region FA may correspond to the second display region DA2.

In an embodiment, an entirety of the folding region FA may correspond to only one of the first display region DA1 and the second display region DA2.

In an embodiment, the first display region DA1 may correspond to a first portion of the first non-folding region NFA1, and the second display region DA2 may correspond to a second portion of the first non-folding region NFA1, the folding region FA, and the second non-folding region NFA2. That is, an area of the second display area DA2 may be greater than an area of the first display area DA1.

In an embodiment, the first display region DA1 may correspond to the first non-folding region NFA1, the folding region FA, and a first portion of the second non-folding region NFA2, and the second display region DA2 may correspond to a second portion of the second non-folding region NFA2. That is, the area of the first display area DA1 may be greater than the area of the second display area DA2.

As illustrated in FIG. 2B, in a folded state of the display device DD2, the first display region DA1 may correspond to the first non-folding region NFA1, and the second display region DA2 may correspond to the folding region FA and the second non-folding region NFA2.

Although FIGS. 2A and 2B illustrate the display device DD2 having one folding region as an example of a display device, an embodiment of the inventive concept is not limited thereto. For example, an embodiment of the inventive concept may also be applied to a display device having two or more folding regions, a rollable display device, a slidable display device, or the like.

The display device DD illustrated in FIG. 1 is described as an example below, but the following descriptions may also be applied to the display device DD2 illustrated in FIGS. 2A and 2B.

Figure 3A:
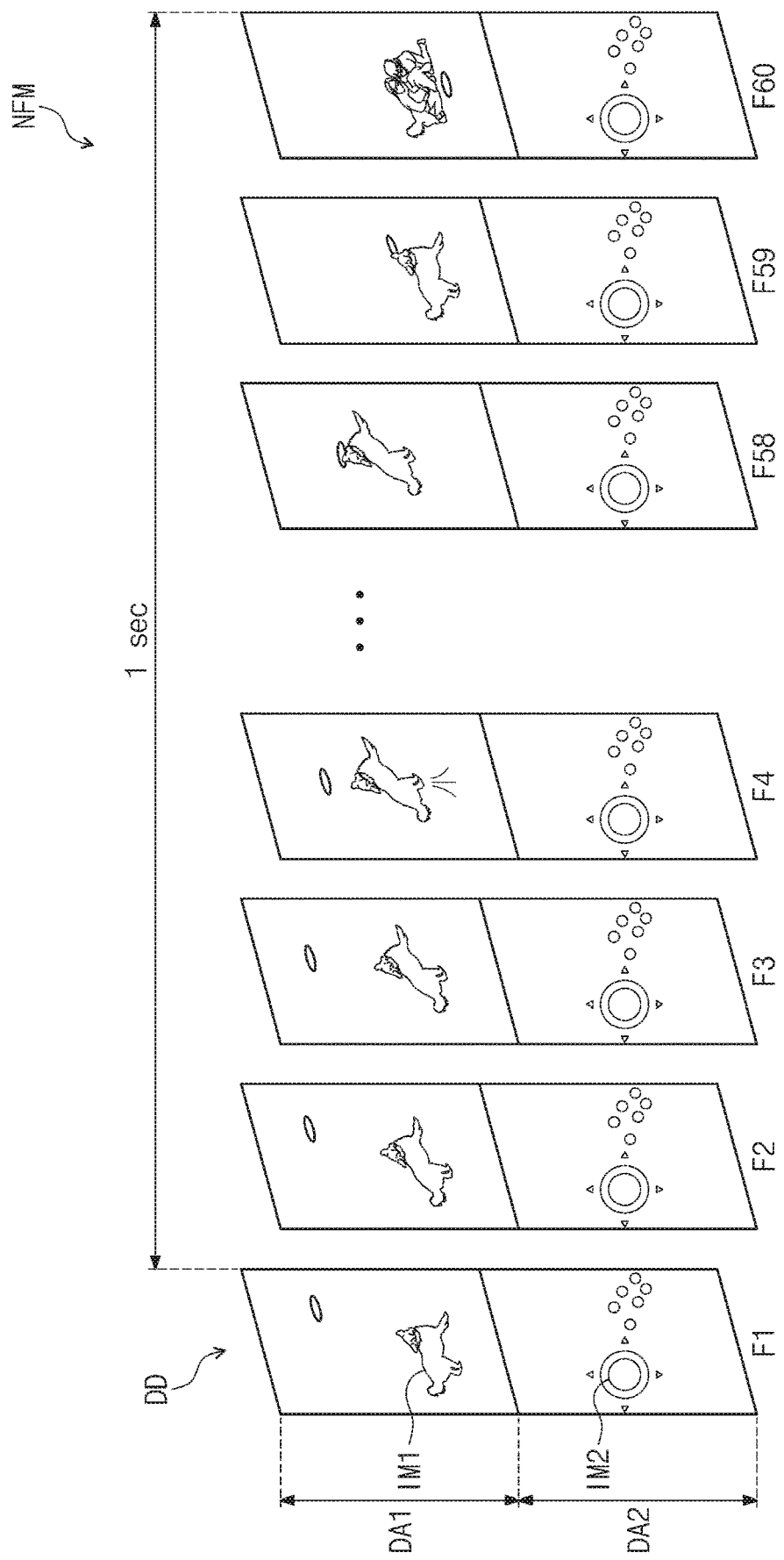
FIG. 3A is a diagram for describing operation of a display device at a normal mode.

FIG. 3A is a diagram for describing operation of a display device at a normal mode. FIG. 3B is a diagram for describing operation of a display device at a multi-frequency mode.

Referring to FIG. 3A, the first image IM1 displayed in the first display region DA1 may be a moving image and the second image IM2 displayed in the second display region DA2 may be a still image or an image which is not changed frequently (e.g., a game operating keypad). The first image IM1 displayed in the first display region DA1 and the second image IM2 displayed in the second display region DA2, illustrated in FIG. 1, are examples, and various images may be displayed on the display device DD.

In a normal mode NFM, the driving frequency of each of the first display region DA1 and the second display region DA2 of the display device DD is a normal frequency. For example, the normal frequency may be 60 Hz. In the normal mode NFM, images of a first frame F1 to $60^{th}$ frame F60 may be displayed during one second in the first display region DA1 and the second display region DA2 of the display device DD.

Referring to FIG. 3B, in a multi-frequency mode MFM, the display device DD may set the driving frequency of the first display region DA1 in which the first image IM1, i.e., a moving image, is displayed to a first driving frequency, and may set the driving frequency of the second display region DA2 in which the second image IM2, i.e., a still image, is displayed to a second driving frequency lower than the first driving frequency. When the normal frequency is 120 Hz, the first driving frequency may be 120 Hz, and the second driving frequency may be 1 Hz. The first driving frequency and the second driving frequency may be variously changed. For example, the first driving frequency may be 120 Hz that is equal to the normal frequency or 144 Hz that is higher than the normal frequency, and the second driving frequency may be one among 30 Hz, 15 Hz, and 10 Hz that are lower than the normal frequency.

When the first driving frequency is 120 Hz and the second driving frequency is 1 Hz in the multi-frequency mode MFM, the first image IM1 is displayed in each of the first frame F1 to $120^{th}$ frame F120 in the first display region DA1 of the display device DD during one second. In the second display region DA2, the second image IM2 may be displayed only in the first frame F1 and may not be displayed in the other frames F2 to F120. Operation of the display device DD in the multi-frequency mode MFM will be described in more detail later.

Figure 4:
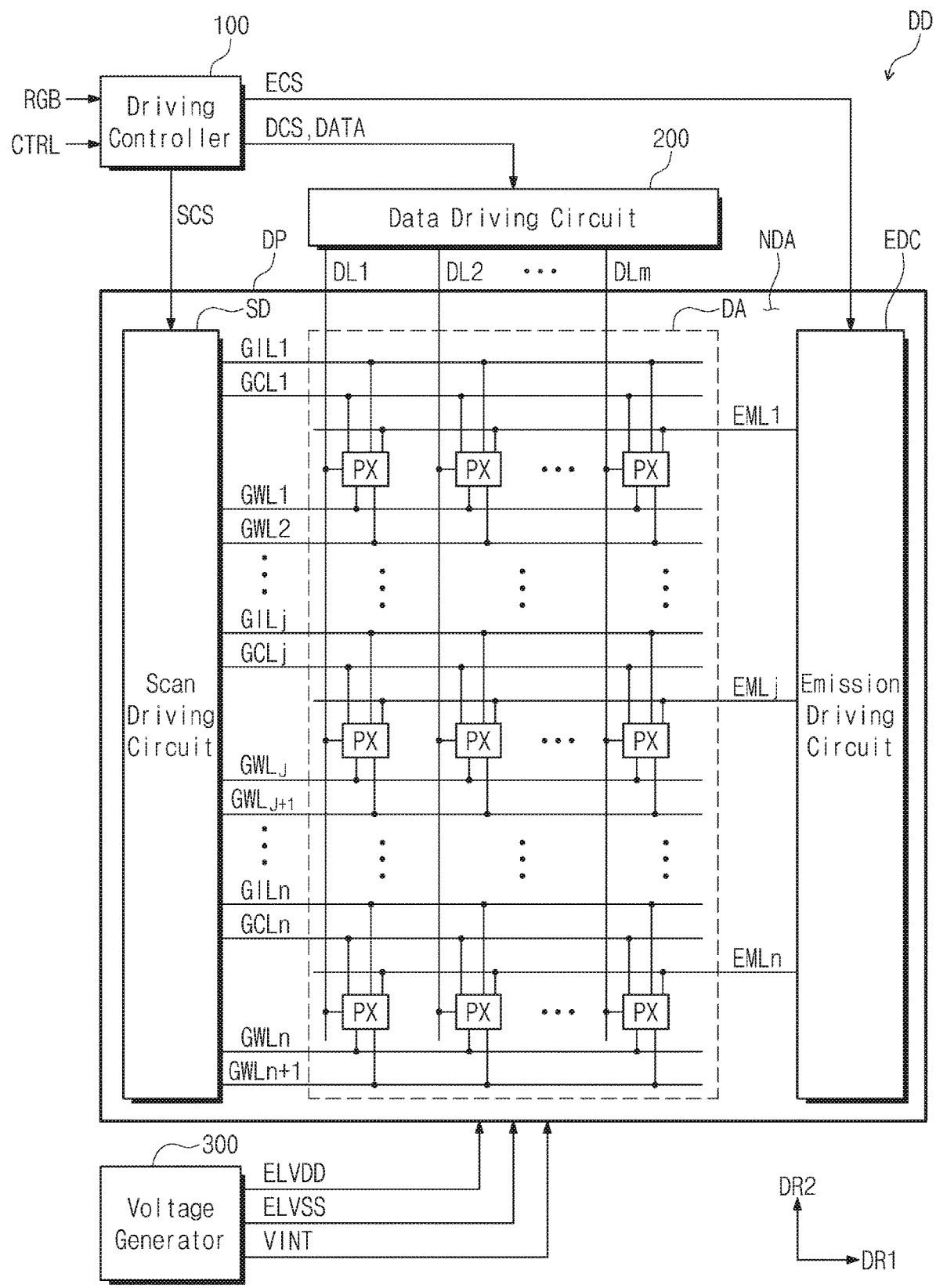
FIG. 4 is a block diagram illustrating a display device according to an embodiment of the inventive concept.

FIG. 4 is a block diagram illustrating a display device according to an embodiment of the inventive concept.

Referring to FIG. 4, the display device DD includes a display panel DP, a driving controller 100, a data driving circuit 200, and a voltage generator 300.

The driving controller 100 receives an image signal RGB and a control signal CTRL. The driving controller 100 generates image data signal DATA by converting a data format of the image signal RGB so that the image signal RGB is compatible with a specification of interface with the data driving circuit 200. The driving controller 100 outputs a scan control signal SCS, a data control signal DCS, and an emission control signal ECS.

The driving controller 100 according to an embodiment of the inventive concept may change the operation mode to the normal mode when a difference between an image signal of a current frame to be displayed in the first display region DA1 (refer to FIG. 1) and an image signal of a previous frame is greater than a reference value during the multi-frequency mode.

The data driving circuit 200 receives the data control signal DCS and the image data signal DATA from the driving controller 100. The data driving circuit 200 converts the image data signal DATA into data signals, and outputs the data signals to a plurality of data lines DL1 to DLm that will be described later. The data signals are analog voltages that correspond to gradation values of the image data signal DATA.

The voltage generator 300 generates voltages required for operating the display panel DP. In this embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, emission control lines EML1 to EMLn, data lines DL1 to DLm, and pixels PX. The display panel DP may further include a scan driving circuit SD and an emission driving circuit EDC. In an embodiment, the scan driving circuit SD is arranged on a first side of the display panel DP. The scan lines GIL1 to GILn, GCL1 to GCLn, and GWL1 to GWLn+1 may extend from the scan driving circuit SD in the first direction DR1.

The emission driving circuit EDC is arranged on a second side of the display panel DP. The emission control lines EML1 to EMLn extend from the emission driving circuit EDC in an opposite direction to the first direction DR1.

The scan lines GIL1 to GILn, GCL1 to GCLn, and GWL1 to GWLn+1 and the emission control lines EML1 to EMLn are arranged spaced apart from each other in the second direction DR2. The data lines DL1 to DLm extend from the data driving circuit 200 in an opposite direction to the second direction DR2 and are arranged spaced apart from each other in the first direction DR1.

In the example illustrated in FIG. 4, the scan driving circuit SD and the emission driving circuit EDC face each other with the pixels PX disposed therebetween, but an embodiment of the inventive concept is not limited thereto. For example, the scan driving circuit SD and the emission driving circuit EDC may be arranged adjacent to each other on the first side or the second side of the display panel DP. In an embodiment, the scan driving circuit SD and the emission driving circuit EDC may be configured as one circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. For example, as illustrated in FIG. 4, pixels of a first row may be connected to the scan lines GILL, GCL1, GWL1, and GWL2 and the emission control line EML1. Furthermore, pixels of a $j^{th}$ row may be connected to the scan lines GILj, GCLj, GWLj, and GWLj+1 and the emission control line EMLj.

Each of the plurality of pixels PX includes a light-emitting diode ED (refer to FIG. 5) and a pixel circuit part PXC (refer to FIG. 5) for controlling emission of the light-emitting diode ED. The pixel circuit part PXC may include at least one transistor and at least one capacitor. The scan driving circuit SD and the emission driving circuit EDC may include transistors formed through the same process as the pixel circuit part PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SD receives the scan control signal SCS from the driving controller 100. The scan driving circuit SD may output scan signals to the scan lines GIL1 to GILn, GCL1 to GCLn, and GWL1 to GWLn+1 in response to the scan control signal SCS. A circuit configuration and operation of the scan driving circuit SD will be described in detail later.

The driving controller 100 according to an embodiment may divide the display panel DP into the first display region DA1 (refer to FIG. 1) and the second display region DA2 (refer to FIG. 1) and set the driving frequency of each of the first display region DA1 and the second display region DA2 according to the image signal RGB. For example, the driving controller 100 drives each of the first display region DA1 and the second display region DA2 at a normal frequency (e.g., 60 Hz) in the normal mode. In the multi-frequency mode, the driving controller 100 may drive the first display region DA1 at a first driving frequency (e.g., 120 Hz) and the second display region DA2 at a second driving frequency (e.g., 1 Hz).

Figure 5:
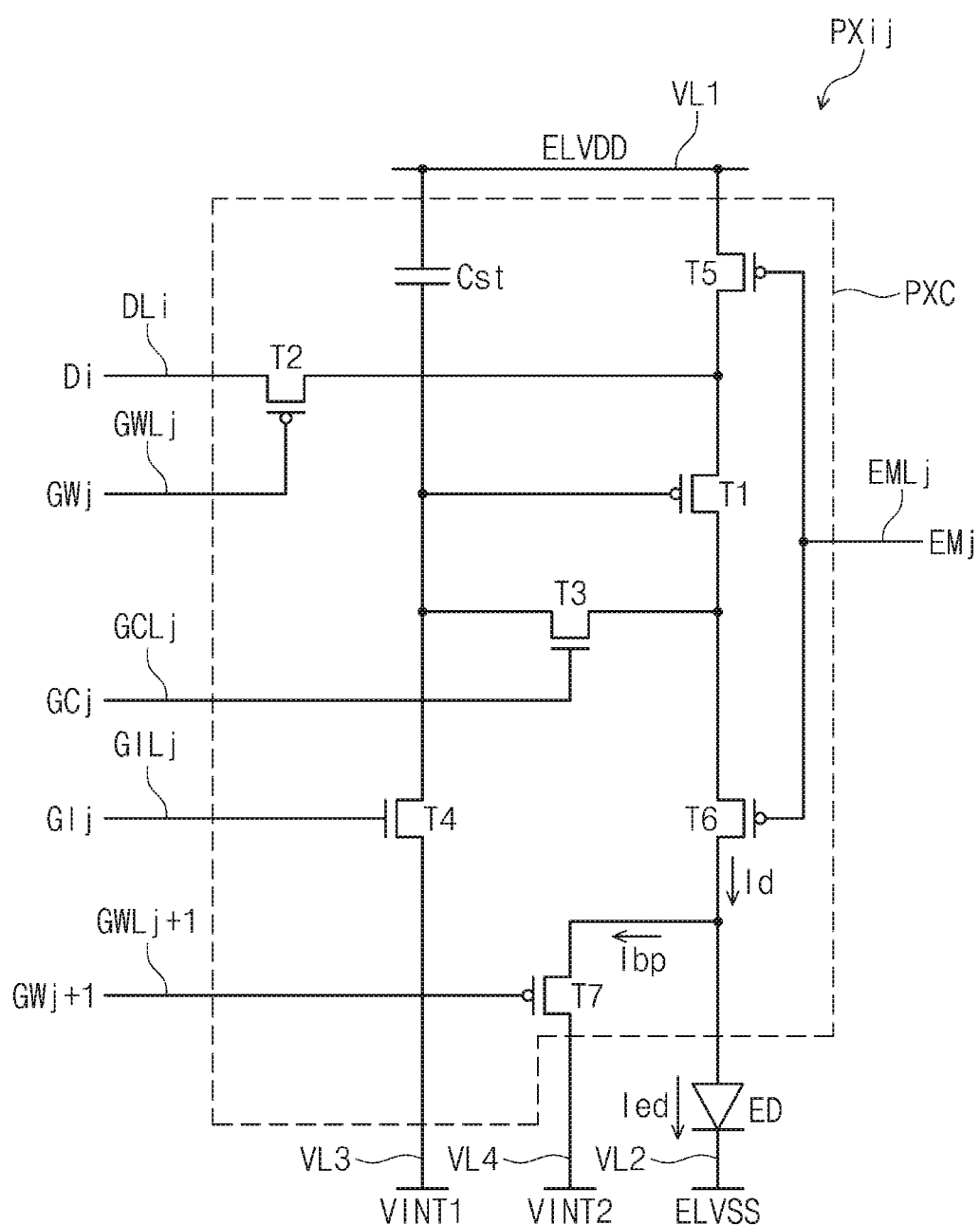
FIG. 5 is an equivalent circuit diagram of a pixel according to an embodiment of the inventive concept.

FIG. 5 is an equivalent circuit diagram of a pixel according to an embodiment of the inventive concept.

FIG. 5 illustrates an equivalent circuit diagram of a pixel PXij connected to an $i^{th}$ data line DLi among the data lines DL1 to DLm illustrated in FIG. 4, $j^{th}$ scan lines GILj, GCLj, and GWLj and $(j+1)^{th}$ scan line GWLj+1 among the scan lines GIL1 to GILn, GCL1 to GCLn, and GWL1 to GWLn+1, and a $j^{th}$ emission control line EMLj among the emission control lines EML1 to EMLn.

Each of the plurality of pixels PX illustrated in FIG. 4 may have the same circuit configuration as the equivalent circuit diagram of the pixel PXij illustrated in FIG. 5. In this embodiment, in the pixel circuit part PXC of the pixel PXij, third and fourth transistors T3 and T4 among first to seventh transistors T1 to T7 are N-type transistors having an oxide semiconductor as a semiconductor layer, and first, second, fifth, sixth, and seventh transistors T1, T2, T5, T6, and T7 are P-type transistors having a low-temperature polycrystalline silicon (LTPS) semiconductor layer. However, an embodiment of the inventive concept is not limited thereto, all of the first to seventh transistors T1 to T7 may be P-type transistors or N-type transistors. In another embodiment, at least one of the first to seventh transistors T1 to T7 may be an N-type transistor and the others may be P-type transistors. Furthermore, the circuit configuration of a pixel according to an embodiment of the inventive concept is not limited to that illustrated in FIG. 5. The pixel circuit part PXC illustrated in FIG. 5 is merely an example, and the configuration of the pixel circuit part PXC may be modified as required.

Referring to FIG. 5, the pixel PXij of a display device according to an embodiment may include the first to seventh transistors T1 to T7, a capacitor Cst, and at least one light-emitting diode ED. In this embodiment, an example in which one pixel PXij includes one light-emitting diode ED is described.

The scan lines GILj, GCLj, GWLj, and GWLj+1 may respectively transfer scan signals GIj, GCj, GWj, and GWj+1, and the emission control line EMLj may transfer an emission signal EMj. The data line DLi transfers a data signal Di. The data signal Di may have a voltage level corresponding to the image signal RGB input to the display device DD to the driving controller 100 (refer to FIG. 4). First to fourth driving voltage lines VL1, VL2, VL3, and VL4 may transfer the first driving voltage ELVDD, the second driving voltage ELVSS, the first initialization voltage VINT1, and the second initialization voltage VINT2, respectively.

The first transistor T1 includes a first electrode connected to the first driving voltage line VL1 via the fifth transistor T5, a second electrode electrically connected to an anode of the light-emitting diode ED via the sixth transistor T6, and a gate electrode connected to one end of the capacitor Cst. The first electrode of the first transistor T1 may receive the data signal Di supplied from the data line DLi according to a switching operation of the second transistor T2 and the first transistor T1 may supply a driving current Id to the light-emitting diode ED in response to the emission signal EMj received through the emission control line EMLj.

The second transistor T2 includes a first electrode connected to the data line DLi, a second electrode connected to the first electrode of the first transistor T1, and a gate electrode connected to the scan line GWLj. The second transistor T2 may be turned on in response to the scan signal GWj received through the scan line GWLj to transfer the data signal Di received through the data line DLi.

The third transistor T3 includes a first electrode connected to the gate electrode of the first transistor T1, a second electrode connected to the second electrode of the first transistor T1, and a gate electrode connected to the scan line GCLj. The third transistor T3 may be turned on in response to the scan signal GCj received through the scan line GCLj to connect the gate electrode and the second electrode of the first transistor T1 to each other so as to diode-connect the first transistor T1.

The fourth transistor T4 includes a first electrode connected to the gate electrode of the first transistor T1, a second electrode connected to the third voltage line VL3 through which the first initialization voltage VINT1 is transferred, and a gate electrode connected to the scan line GILj. The fourth transistor T4 is turned on in response to the scan signal GIj received through the scan line GILj and transfers the first initialization voltage VINT1 to the gate electrode of the first transistor T1 to perform an initialization operation for initializing a voltage of the gate electrode of the first transistor T1.

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light-emitting diode ED, and a gate electrode connected to the emission control line EMLj.

The fifth transistor T5 and the sixth transistor T6 may be simultaneously turned on in response to the emission signal EMj received through the emission control line EMLj so that the first driving voltage ELVDD may be compensated through the diode-connected first transistor T1 and transferred to the light-emitting diode ED.

The seventh transistor T7 includes a first electrode connected to the second electrode of the sixth transistor T6 and the anode of the light-emitting diode ED, a second electrode connected to the fourth voltage line VL4, and a gate electrode connected to the scan line GWLj+1. The seventh transistor T7 may be turned on in response to the scan signal GWj+1 received through the scan line GWLj+1 to bypass a current of the anode of the light-emitting diode ED to the fourth voltage line VL4.

One end of the capacitor Cst is connected to the gate electrode of the first transistor T1 as described above, and the other end is connected to the first driving voltage line VL1. A cathode of the light-emitting diode ED may be connected to the second driving voltage line VL2 for transferring the second driving voltage ELVSS. A structure of the pixel PXij according to an embodiment of the inventive concept is not limited to the structure illustrated in FIG. 5, and thus the number of transistors and the number of capacitors included in one pixel PXij and a connection relationship therebetween may be variously modified.

Figure 6:
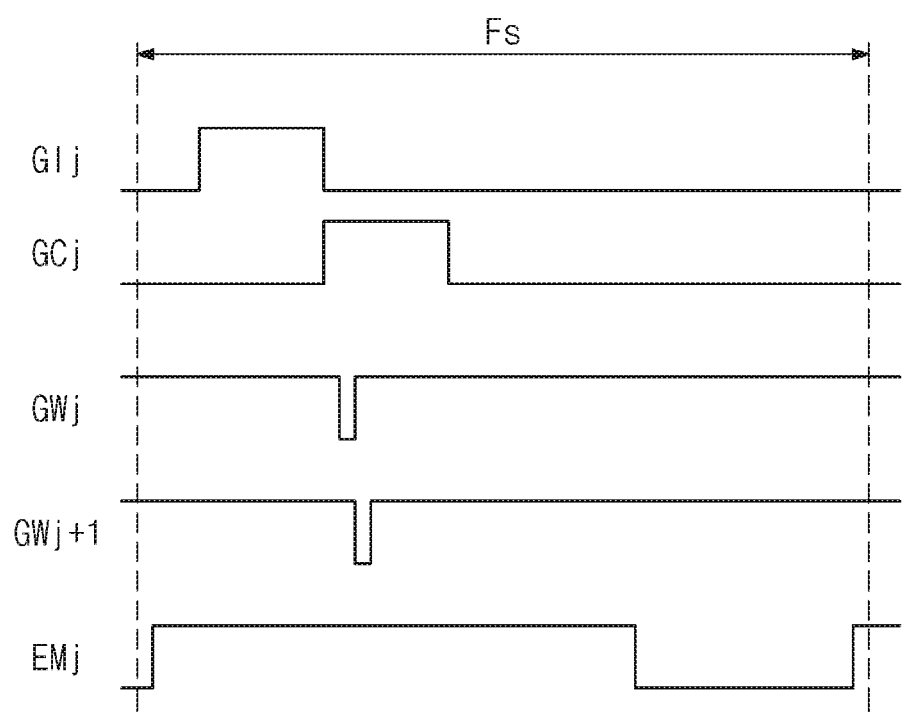
FIG. 6 is a timing diagram illustrating operation of the pixel illustrated in FIG. 5.

FIG. 6 is a timing diagram illustrating operation of the pixel illustrated in FIG. 5. Operation of a display device according to an embodiment will be described with reference to FIGS. 5 and 6.

Referring to FIGS. 5 and 6, the scan signal GIj of a turn-on level (for example, high level) is provided through the scan line GILj during an initialization period within one frame Fs. The fourth transistor T4 is turned on in response to the scan signal GIj of a turn-on level (for example, high level), and the first initialization voltage VINT1 is transferred to the gate electrode of the first transistor T1 via the fourth transistor T4 so that the first transistor T1 is initialized.

Next, the third transistor T3 is turned on when the scan signal GCj of a turn-on level is supplied via the scan line GCLj during a data programming and compensation period. The first transistor T1 is diode-connected by the turned on third transistor T3 and is forward biased. Furthermore, the second transistor T2 is turned on by the scan signal GWj of a turn-on level (for example, low level). As a result, a compensation voltage Di-Vth obtained by subtracting a threshold voltage Vth of the first transistor T1 from the data signal Di supplied through the data line DLi is applied to the gate electrode of the first transistor T1. That is, a gate voltage applied to the gate electrode of the first transistor T1 may be the compensation voltage Di-Vth.

The first driving voltage ELVDD and the compensation voltage Di-Vth may be applied to two electrodes of the capacitor Cst, and electric charge corresponding to a difference between the voltages of the two electrodes may be stored in the capacitor Cst.

The seventh transistor T7 is supplied with the scan signal GWj+1 of a turn-on level through the scan line GWLj+1 so as to be turned on. A portion of the driving current Id may pass through the seventh transistor T7 as a bypass current Ibp.

Because the light-emitting diode ED may emit light even when the first transistor T1 is turned off due to a leakage current flowing through the first transistor T1, the black image may not be displayed normally. Therefore, the seventh transistor T7 included in the pixel PXij according to an embodiment of the inventive concept may bypass the leakage current as bypass current Ibp through the seventh transistor T7. Thereby, the leakage current does not flow through the light-emitting diode ED and real black images may be displayed in the pixels. Here, the leakage current of the first transistor T1 represents a current flowing through the first transistor T1 under a condition in which the first transistor T1 is turned off when a gate-source voltage Vgs of the first transistor T1 is less than the threshold voltage Vth. The leakage current (e.g., about 10 pA or less) under the condition in which the first transistor T1 is turned off is transferred to the light-emitting diode ED so as to be expressed as a black image. The effect of the bypass of the bypass current Ibp may be significant when the leakage current for displaying a black image flows, whereas the effect of the leakage current may be negligible when a large driving current for displaying an image, for example, a general image or a white image, flows. Therefore, when displaying a black image, because a major portion of the leakage current flows through the seventh transistor T7 as the bypass current Ibp, an emission current Ted of the light-emitting diode ED may be near zero. Therefore, a real black image may be obtained using the seventh transistor T7, thereby improving a contrast ratio. In this embodiment, a bypass signal is the scan signal GWj+1 of a turn-on level, but an embodiment of the inventive concept is not limited thereto.

Next, during an emission period, the emission signal EMj supplied through the emission control line EMLj is changed from a turn-off level to a turn-on level. During the emission period, the fifth transistor T5 and the sixth transistor T6 are turned on by the emission signal EMj of a turn-on level. As a result, the driving current Id is generated according to a voltage difference between the first driving voltage ELVDD and the gate voltage of the gate electrode of the first transistor T1, and the driving current Id is supplied to the light-emitting diode ED via the sixth transistor T6 so that the current Ted flows through the light-emitting diode ED.

Figure 7:
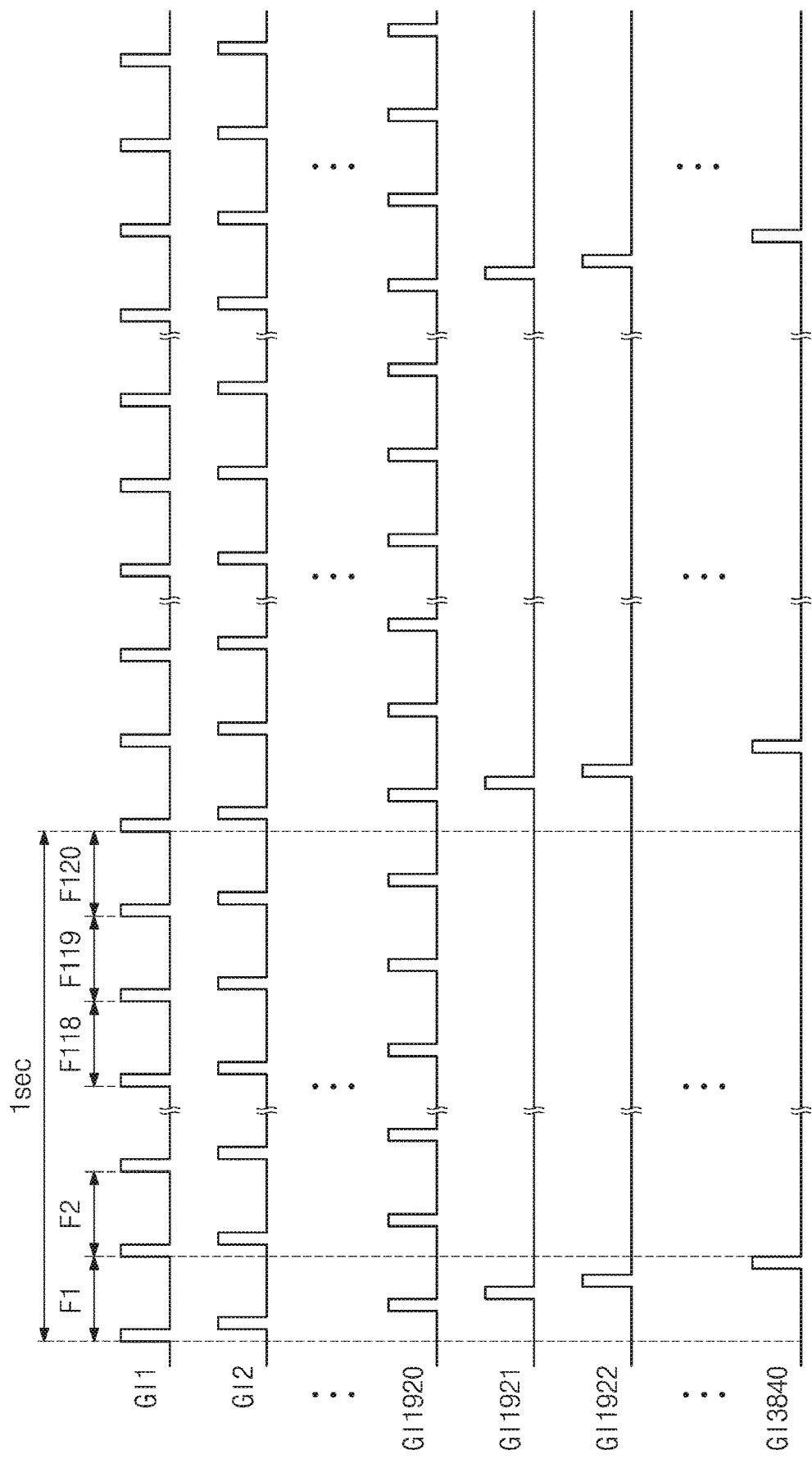
FIG. 7 illustrates scan signals in a multi-frequency mode.

FIG. 7 illustrates scan signals GI1 to GI3840 in the multi-frequency mode.

Referring to FIG. 7, in the multi-frequency mode, the frequency of the scan signals GI1 to GI1920 is 120 Hz, and the frequency of the scan signals GI1921 to SC3840 is 1 Hz.

For example, the scan signals GI1 to GI1920 correspond to the first display region DA1 of the display device DD illustrated in FIG. 1, and the scan signals GI1921 to SC3840 correspond to the second display region DA2 of the display device DD illustrated in FIG. 1.

The scan signals GI1 to GI1920 may be activated to a turn-on level in each of first frame F1 to $120^{th}$ frame F120, and the scan signals GI1921 to GI3840 may be activated to a turn-on level only in the first frame F1.

Therefore, the first display region DA1, in which a moving image is displayed, may be driven with the scan signals GI1 to GI1920 of a normal frequency (e.g., 120 Hz), and the second display region DA2, in which a still image is displayed, may be driven with the scan signals GI1921 to GI3840 of a low frequency (e.g., 1 Hz). Since only the second display region DA2, in which a still image is displayed, is driven at a low frequency, power consumption may be reduced without deterioration of display quality of the display device DD (refer to FIG. 1).

Although FIG. 7 illustrates only the scan signals GI1 to GI3840, the scan driving circuit SD (refer to FIG. 4) and the emission driving circuit EDC (refer to FIG. 4) may generate scan signals GC1 to GC3840 and GW1 to GW3840 and emission signals EM1 to EM3840 in a similar manner to that for the scan signals GI1 to GI3840.

Figure 8:
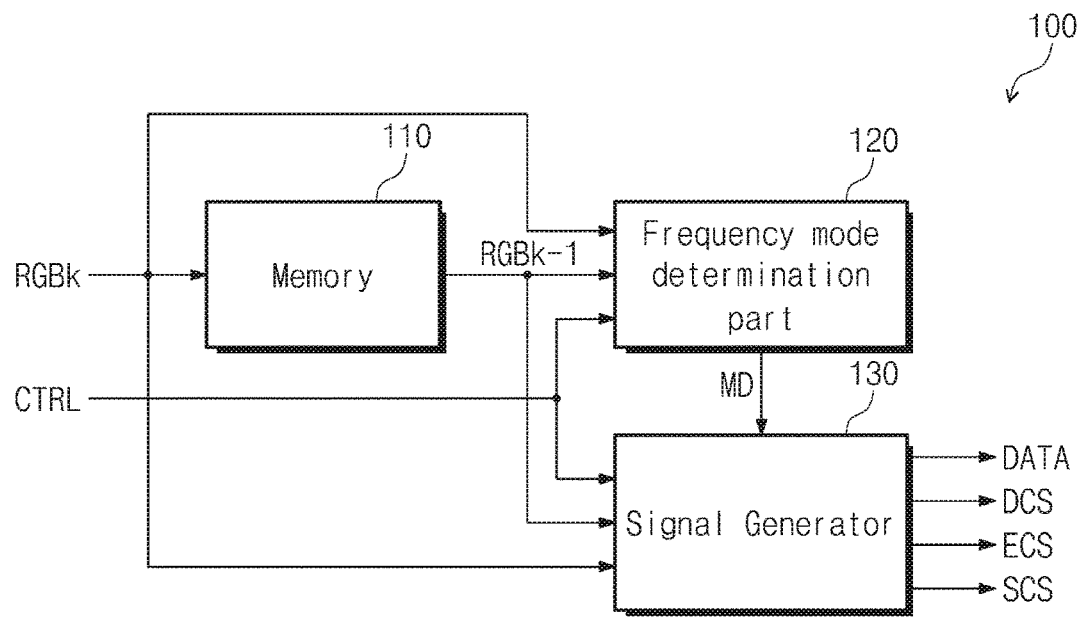
FIG. 8 is a block diagram illustrating a configuration of a driving controller according to an embodiment of the inventive concept.

FIG. 8 is a block diagram illustrating a configuration of a driving controller according to an embodiment of the inventive concept.

Referring to FIGS. 4 and 8, the driving controller 100 includes a memory 110, a frequency mode determination part 120, and a signal generator 130. The memory 110 stores an image signal RGBk of a current frame (e.g., $k^{th}$ frame). The memory 110 may store an image signal of one frame, but an embodiment of the inventive concept is not limited thereto. For example, the memory 110 may store only an image signal of a portion of one frame.

The frequency mode determination part 120 determines a frequency mode in response to the image signal RGBk of the current frame (e.g., $k^{th}$ frame), an image signal RGBk−1 of a previous frame (e.g., $(k−1)^{th}$ frame) stored in the memory 110, and the control signal CTRL, and outputs a mode signal MD corresponding to the determined frequency mode. The mode signal MD may be a 1-bit signal indicating a normal mode and a multi-frequency mode. In an embodiment, the mode signal MD may include information for selecting a second driving frequency in the multi-frequency mode. In this case, a bit width of the mode signal MD may be at least two bits.

The signal generator 130 outputs the image data signal DATA, the data control signal DCS, the emission control signal ECS, and the scan control signal SCS in response to the image signal RGBk of the current frame, the image signal RGBk−1 of the previous frame, the control signal CTRL, and the mode signal MD.

When the mode signal MD indicates the normal mode, the signal generator 130 may output the image data signal DATA, the data control signal DCS, the emission control signal ECS, and the scan control signal SCS for driving each of the first display region DA1 (refer to FIG. 1) and the second display region DA2 (refer to FIG. 1) at a normal driving frequency.

When the mode signal MD indicates the multi-frequency mode, the signal generator 130 may output the image data signal DATA, the data control signal DCS, the emission control signal ECS, and the scan control signal SCS for driving the first display region DA1 at a first driving frequency and the second display region DA2 at the second driving frequency.

The data driving circuit 200, the scan driving circuit SD, and the emission driving circuit EDC illustrated in FIG. 4 operate in response to the image data signal DATA, the data control signal DCS, the emission control signal ECS, and the scan control signal SCS so that an image is displayed on the display panel DP.

A circuit configuration and/or operation of each of the frequency mode determination part 120 and the signal generator 130 is described in detail below.

Figure 9:
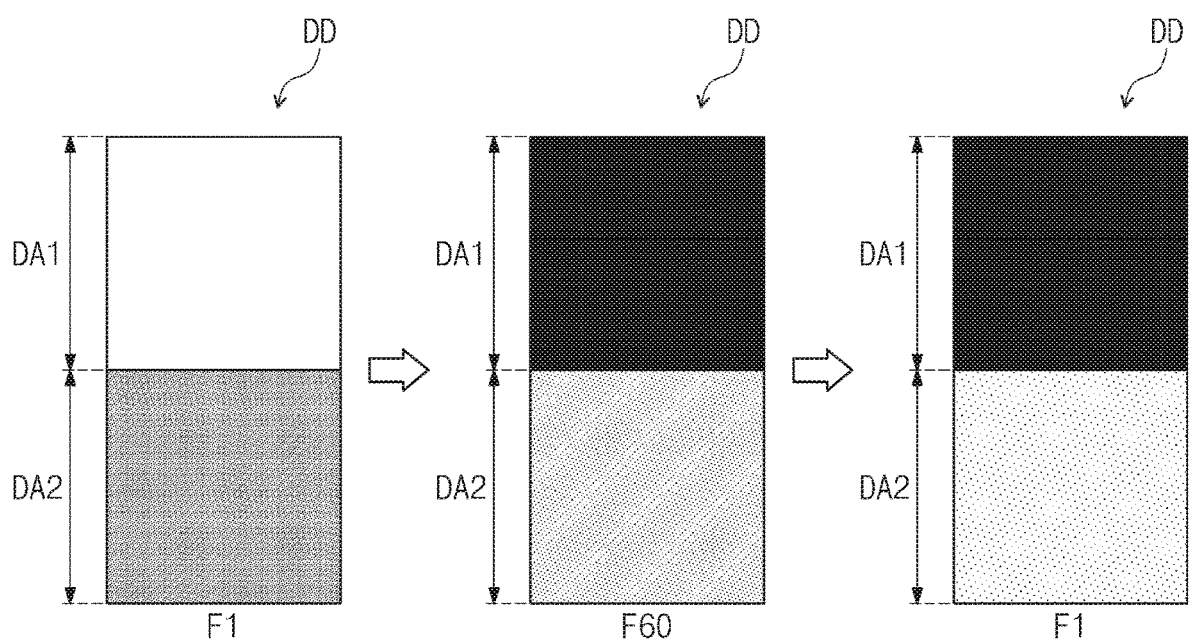
FIG. 9 is a diagram illustrating a luminance change of a first display region and a second display region in a multi-frequency mode.

FIG. 9 is a diagram illustrating a luminance change of the first display region DA1 and the second display region DA2 in a multi-frequency mode.

Referring to FIG. 9, a white image may be displayed in the first display region DA1, and a grey image may be displayed in the second display region DA2 in a first frame F1. For example, the image displayed in the second display region DA2 may have a luminance of about 412 nits.

In the multi-frequency mode, the first display region DA1 may be driven at the first driving frequency (e.g., 120 Hz) and the second display region DA2 may be driven at the second driving frequency (e.g., 1 Hz). That is, an image displayed in the first display region DA1 may be change in each frame from a first frame to a 120$^{th}$ frame, and an image displayed in the second display region DA2 may not be changed during a period from the first frame F1 to the 120$^{th}$ frame.

When the image displayed in the first display region DA1 is changed from a white image to a black image in the 60$^{th}$ frame, the luminance of the image displayed in the second display region DA2 may be changed to about 416 nit because the voltage level of the first driving voltage ELVDD provided to the pixels PX (refer to FIG. 4) is changed according to a load.

When a difference between the gradation of a k$^{th}$ frame and the gradation of a (k+1)$^{th}$ frame is large, the voltage level of the first driving voltage ELVDD fluctuates, causing a change in the gate-source voltage Vgs of the first transistor T1 (refer to FIG. 5). As a result, the current Ied (refer to FIG. 5) flowing to the light-emitting diode ED (refer to FIG. 5) is changed. A change in the current Ied flowing to the light-emitting diode ED causes luminance change.

Therefore, as illustrated in FIG. 9, when the image displayed in the first display region DA1 is changed from a white image to a black image in the 60$^{th}$ frame, the luminance of the image displayed in the second display region DA2 may be changed to about 416 nits.

When the first frame F1 arrives again after images of first to 120$^{th}$ frames are displayed in the first display region DA1 and the second display region DA2, the luminance of the second display region DA2 may be changed to about 436 nits. When the data signal Di is provided to the pixels PX in the second display region DA2, a variation in the gate-source voltage Vgs of the first transistor T1 (refer to FIG. 5) directly changes the current Ied flowing to the light-emitting diode ED (refer to FIG. 5), and thus a luminance change of the second display region DA2 may increase.

As described above, when the difference between the gradation of the k$^{th}$ frame and the gradation of the (k+1)$^{th}$ frame is large, a voltage level change of the first driving voltage ELVDD may be compensated by applying an IR drop compensation (IRC) function. That is, a luminance change may be prevented by applying a compensation value determined according to the difference between the gradation of the k$^{th}$ frame and the gradation of the (k+1)$^{th}$ frame to the data signal Di of the kth frame.

Figure 10:
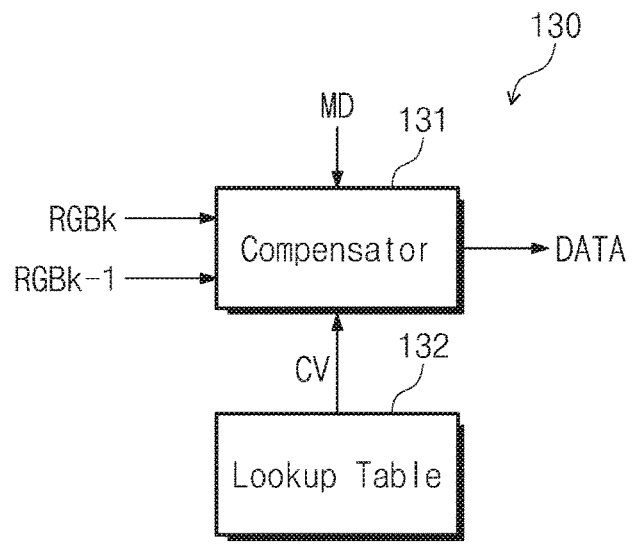
FIG. 10 is a block diagram illustrating a circuit configuration of the signal generator illustrated in FIG. 8.

FIG. 10 is a block diagram illustrating a circuit configuration of the signal generator 130 illustrated in FIG. 8.

FIG. 10 only illustrates circuit blocks of the signal generator 130 related to the IRC function. The signal generator 130 may further include various circuit blocks for outputting the image data signal DATA, the data control signal DCS, the emission control signal ECS, and the scan control signal SCS in response to the image signal RGBk of the current frame, the image signal RGBk−1 of the previous frame, the control signal CTRL, and the mode signal MD.

Referring to FIG. 10, the signal generator 130 includes a compensator 131 and a lookup table 132. The lookup table 132 stores a compensation value CV corresponding to each of gradation differences between the image signal RGBk of the current frame and the image signal RGBk−1 of the previous frame.

The compensation value CV stored in the lookup table 132 may be a value for compensating for a voltage level change of the first driving voltage ELVDD or a variation in the current Ied (refer to FIG. 5) flowing through the light-emitting diode ED (refer to FIG. 5) due to the gradation differences between the image signal RGBk of the current frame and the image signal RGBk−1 of the previous frame.

The compensator 131 reads the compensation value CV corresponding to the gradation difference between the image signal RGBk of the current frame and the image signal RGBk−1 of the previous frame from the lookup table 132 and adds the compensation value CV to the image signal RGBk of the current frame to output the image data signal DATA.

As described above, the signal generator 130 having the IRC function may compensate for the voltage level change of the first driving voltage ELVDD due to a gradation change between the image signal RGBk of the current frame and the image signal RGBk−1 of the previous frame.

As illustrated in FIG. 9, when the gradation change in the image displayed in the first display region DA1 is significant in a frame in which an image is not updated in the second display region DA2, for example, the sixtieth frame F60, in the multi-frequency mode, the signal generator 130 may perform a compensation for the first display region DA1 but may not perform a compensation for the second display region DA2. Thus, the luminance change of the image displayed in the second display region DA2 may still occur.

Figure 11:
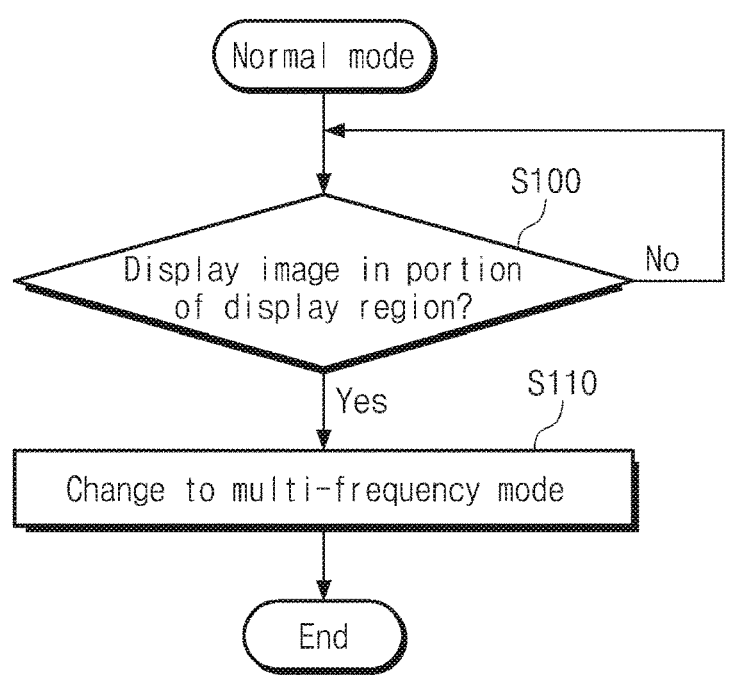
FIG. 11 is a flowchart illustrating operation of a driving controller according to an embodiment of the inventive concept.

FIG. 11 is a flowchart illustrating an operation of a driving controller according to an embodiment of the inventive concept.

Referring to FIGS. 8 and 10, the frequency mode determination part 120 of the driving controller 100 may set an operation mode to a normal mode at an initial stage (e.g., after being powered up).

The frequency mode determination part 120 determines a frequency mode in response to the image signal RGB and the control signal CTRL. For example, when a portion (e.g., an image signal corresponding to the first display region DA1) of the image signal RGB of one frame is a moving image and another portion (e.g., an image signal corresponding to the second display region DA2) is a still image (S100), the frequency mode determination part 120 changes the operation mode to the multi-frequency mode and outputs the mode signal MD corresponding to the determined frequency mode (S110).

Figure 12:
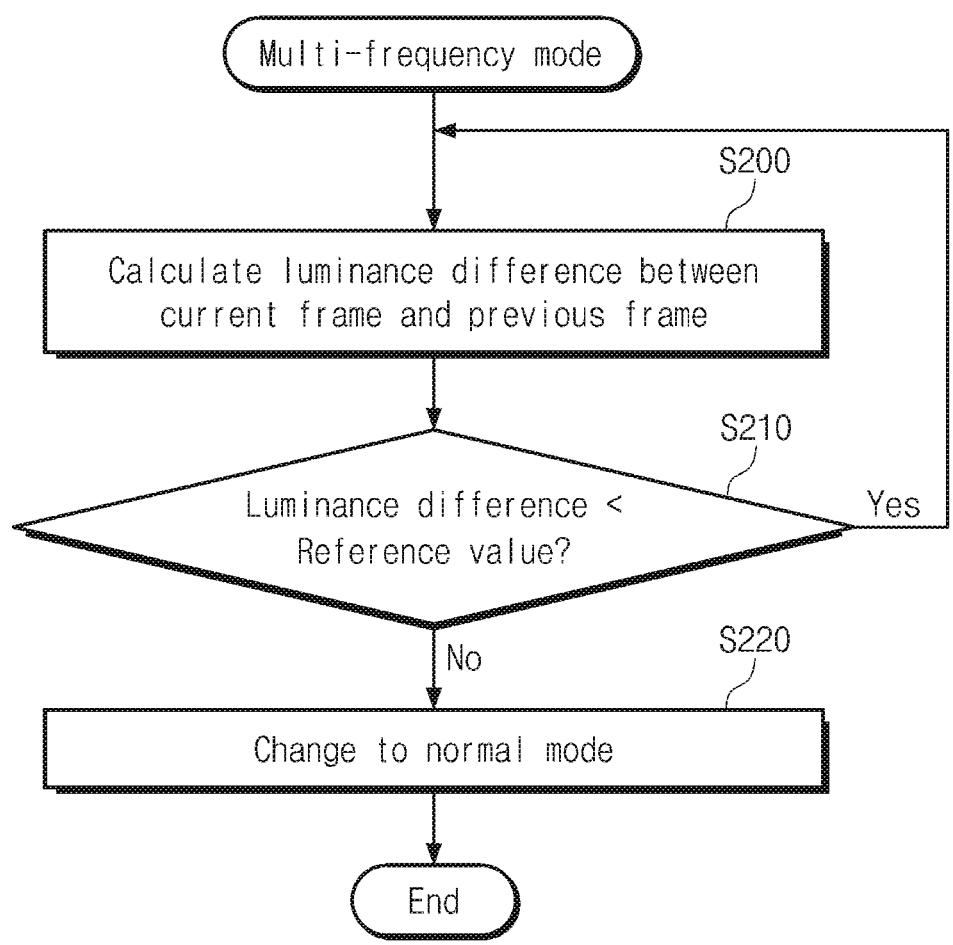
FIG. 12 is a flowchart illustrating operation of a driving controller in a multi-frequency mode according to an embodiment of the inventive concept.

FIG. 12 is a flowchart illustrating operation of a driving controller in a multi-frequency mode according to an embodiment of the inventive concept.

Referring to FIGS. 8 and 12, the first display region DA1 may be driven at a first driving frequency and the second display region DA2 may be driven at a second driving frequency lower than the first driving frequency during the multi-frequency mode.

The frequency mode determination part 120 of the driving controller 100 calculates a luminance difference (or difference value) between the image signal RGBk of the current frame and the image signal RGBk-1 of the previous frame stored in the memory 110 in the multi-frequency mode (S200). Each of the image signal RGBk of the current frame and the image signal RGBk-1 of the previous frame may have a certain gradation level. The driving controller 100 may calculate a luminance difference on the basis of a gradation level difference between the image signal RGBk of the current frame and the image signal RGBk-1 of the previous frame. In this embodiment, the driving controller 100 calculates the luminance difference using the difference value between the image signal RGBk of the current frame and the image signal RGBk-1 of the previous frame, but an embodiment of the inventive concept is not limited thereto. For example, the driving controller 100 may calculate a difference in the current Ied (refer to FIG. 5) flowing through the light-emitting diode ED (refer to FIG. 5) using the gradation difference between the image signal RGBk of the current frame and the image signal RGBk-1 of the previous frame. In another embodiment, the driving controller 100 may calculate an on-pixel ratio (OPR) difference between the image signal RGBk of the current frame and the image signal RGBk-1 of the previous frame. The on-pixel ratio difference may be a difference between the ratio of maximum luminance of the image signal RGBk of the current frame and the ratio of maximum luminance of the image signal RGBk-1 of the previous frame. As described above, the difference value between the image signal RGBk of the current frame and the image signal RGBk-1 of the previous frame may be any one of a gradation difference, on-pixel ratio difference, current difference, and luminance difference.

The frequency mode determination part 120 compares a reference value with the luminance difference between the image signal RGBk of the current frame and the image signal RGBk-1 of the previous frame (S210).

If the luminance difference between the image signal RGBk of the current frame and the image signal RGBk-1 of the previous frame is less than the reference value, the frequency mode determination part 120 maintains the operation mode as the multi-frequency mode.

If the luminance difference between the image signal RGBk of the current frame and the image signal RGBk-1 of the previous frame is equal to or greater than the reference value, the frequency mode determination part 120 changes the operation mode from the multi-frequency mode to the normal mode and outputs the mode signal MD corresponding to the determined frequency mode (S220).

Referring back to FIG. 9, when the gradation change of the image displayed in the first display region DA1 is significant in a frame in which an image is not updated in the second display region DA2, for example, the sixtieth frame F60, in the multi-frequency mode, the signal generator 130 may perform a compensation for the first display region DA1 but may not perform a compensation for the second display region DA2.

The frequency mode determination part 120 changes the operation mode to the normal mode if the luminance difference between the image signal RGBk of the current frame and the image signal RGBk-1 of the previous frame is greater than the reference value.

Since not only the first display region DA1 but also the second display region DA2 is driven at the normal frequency in the normal mode, the signal generator 130 may output the image data signal DATA corresponding to the first display region DA1 and second display region DA2 for which the voltage level change of the first driving voltage ELVDD has been compensated for. Thus, a luminance change of an image displayed in the second display region DA2 may be prevented.

Referring back to FIGS. 8 and 12, a method suitable for the display device DD may be selected from among various calculation methods for the frequency mode determination part 120 to calculate the luminance difference between the image signal RGBk of the current frame and the image signal RGBk-1 of the previous frame (S200). For example, the frequency mode determination part 120 may calculate a luminance difference on the basis of a difference between an average of the image signal RGBk of the current frame and an average of the image signal RGBk-1 of the previous frame for an entirety of the first display region DA1. In another embodiment, the frequency mode determination part 120 may calculate the luminance difference on the basis of a difference between the image signal RGBk of the current frame and an average of the image signal RGBk-1 of the previous frame for predetermined region(s) or predetermined pixel(s) included in the first display region DAL The reference value may be set to an optimum value within a range in which the luminance difference between the image signal RGBk of the current frame and the image signal RGBk-1 of the previous frame is not visually recognized by a user. A value suitable for an operation environment of the display device DD may be selected as the reference value.

Figure 13:
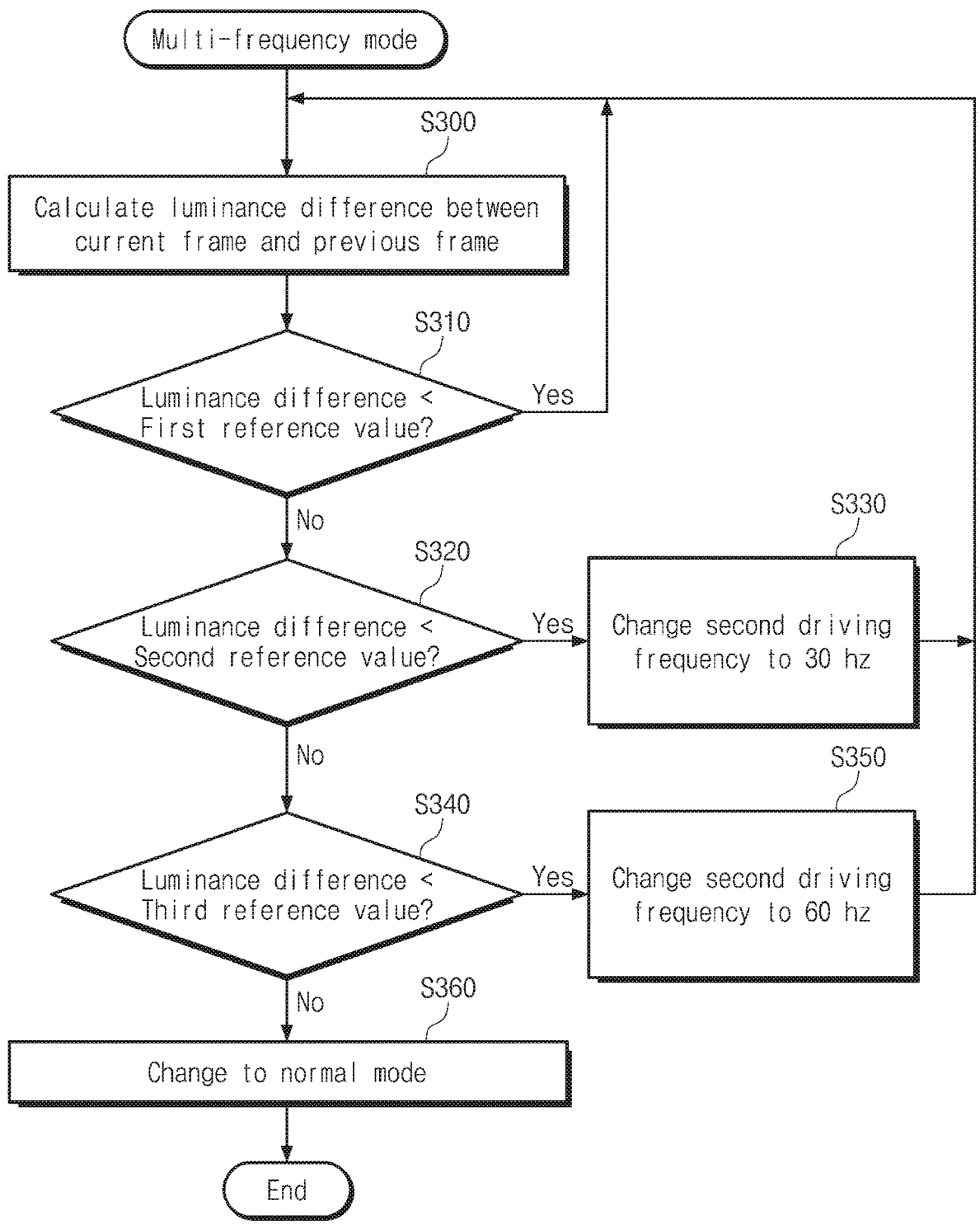
FIG. 13 is a flowchart illustrating operation of a driving controller in a multi-frequency mode according to an embodiment of the inventive concept.

FIG. 13 is a flowchart illustrating operation of a driving controller in a multi-frequency mode according to an embodiment of the inventive concept.

Referring to FIGS. 8 and 13, the first display region DA1 may be driven at a first driving frequency, and the second display region DA2 may be driven at a second driving frequency lower than the first driving frequency during the multi-frequency mode. In this embodiment, the first driving frequency may be 120 Hz, and the second driving frequency may be 1 Hz. The signal generator 130 may output the image data signal DATA, the data control signal DCS, the emission control signal ECS, and the scan control signal SCS so as to drive the first display region DA1 at the first driving frequency and the second display region DA2 at the second driving frequency.

The frequency mode determination part 120 of the driving controller 100 calculates the luminance difference between the image signal RGBk of the current frame and the image signal RGBk-1 of the previous frame stored in the memory 110 in the multi-frequency mode (S300). Each of the image signal RGBk of the current frame and the image signal RGBk-1 of the previous frame may have a certain gradation level. The driving controller 100 may calculate a luminance difference on the basis of a gradation level difference between the image signal RGBk of the current frame and the image signal RGBk-1 of the previous frame.

The frequency mode determination part 120 compares a first reference value with the luminance difference between the image signal RGBk of the current frame and the image signal RGBk-1 of the previous frame (S310).

If the luminance difference between the image signal RGBk of the current frame and the image signal RGBk-1 of the previous frame is less than the first reference value, the frequency mode determination part 120 maintains the operation mode as the multi-frequency mode.

If the luminance difference between the image signal RGBk of the current frame and the image signal RGBk-1 of the previous frame is equal to or greater than the first reference value, the frequency mode determination part 120 compares a second reference value with the luminance difference between the image signal RGBk of the current frame and the image signal RGBk-1 of the previous frame (S320).

If the luminance difference between the image signal RGBk of the current frame and the image signal RGBk-1 of the previous frame is less than the second reference value, the frequency mode determination part 120 changes the second driving frequency of the second display region DA2 to a first frequency level higher than 1 Hz, for example, 30 Hz (S330). The frequency mode determination part 120 outputs the mode signal MD corresponding to the changed second driving frequency to the signal generator 130 and maintains the multi-frequency mode.

If the luminance difference between the image signal RGBk of the current frame and the image signal RGBk-1 of the previous frame is equal to or greater than the second reference value, the frequency mode determination part 120 compares a third reference value with the luminance difference between the image signal RGBk of the current frame and the image signal RGBk-1 of the previous frame (S340).

If the luminance difference between the image signal RGBk of the current frame and the image signal RGBk-1 of the previous frame is less than the third reference value, the frequency mode determination part 120 changes the second driving frequency of the second display region DA2 to a second frequency level higher than 30 Hz, for example, 60 Hz (S350). The frequency mode determination part 120 outputs the mode signal MD corresponding to the changed second driving frequency to the signal generator 130 and maintains the multi-frequency mode.

If the luminance difference between the image signal RGBk of the current frame and the image signal RGBk-1 of the previous frame is equal to or greater than the third reference value, the frequency mode determination part 120 changes the operation mode to the normal mode and outputs the mode signal MD corresponding to the determined frequency mode (S360).

Herein, the first reference value may be less than the second reference value and the second reference value may be less than the third reference value.

When the luminance difference between the image signal RGBk of the current frame and the image signal RGBk-1 of the previous frame is less than the first reference value, the multi-frequency mode is maintained. If the luminance difference between the image signal RGBk of the current frame and the image signal RGBk-1 of the previous frame is equal to or greater than the first reference value and is less than the second reference value, the second driving frequency may be increased to a frequency (for example, 30 Hz) greater than the frequency when the luminance difference between the image signal RGBk of the current frame and the image signal RGBk-1 of the previous frame is less than the first reference value, and the multi-frequency mode is maintained. If the luminance difference between the image signal RGBk of the current frame and the image signal RGBk-1 of the previous frame is equal to or greater than the second reference value and is less than the third reference value, the second driving frequency may be increased to a frequency (for example, 60 Hz) greater than the frequency when the luminance difference between the image signal RGBk of the current frame and the image signal RGBk-1 of the previous frame is equal to or greater than the first reference value and less than the second reference value, and the multi-frequency mode is maintained. If the luminance difference between the image signal RGBk of the current frame and the image signal RGBk-1 of the previous frame is equal to or greater than the third reference value, the operation mode is changed to the normal mode.

As described above, the power consumption of the display device DD may be minimized by maintaining the multi-frequency mode while gradationally increasing the second driving frequency according to the luminance difference between the image signal RGBk of the current frame and the image signal RGBk-1 of the previous frame.

Furthermore, a refresh period for refreshing the second display region DA2, during which a compensation for the change in the first driving voltage ELVDD in the second display region DA2 is performed, is shortened with an increase in the second driving frequency of the second display region DA2. Thus, the deterioration of the display quality of the second display region DA2 may be minimized.

If the luminance difference between the image signal RGBk of the current frame and the image signal RGBk-1 of the previous frame is equal to or greater than the third reference value at which the luminance difference is visually recognizable by the user, the operation mode is changed to the normal mode so that the deterioration of the display quality of the second display region DA2 may be minimized.

Figure 14:
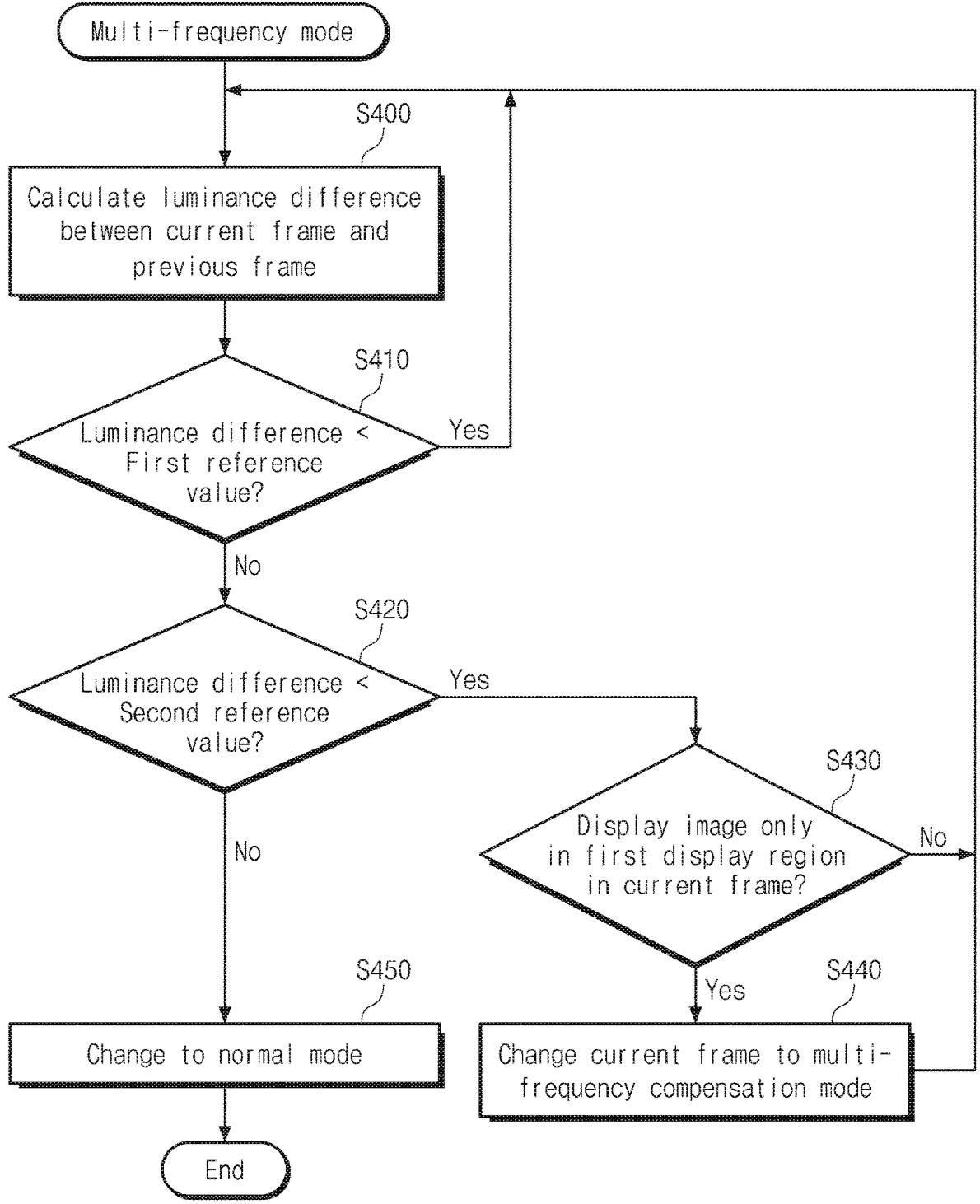
FIG. 14 is a flowchart illustrating operation of a driving controller in a multi-frequency mode according to an embodiment of the inventive concept.

FIG. 14 is a flowchart illustrating operation of a driving controller in a multi-frequency mode according to an embodiment of the inventive concept.

Referring to FIGS. 8 and 14, the first display region DA1 may be driven at a first driving frequency and the second display region DA2 may be driven at a second driving frequency lower than the first driving frequency during the multi-frequency mode. In this embodiment, the first driving frequency may be 120 Hz, and the second driving frequency may be 1 Hz. The signal generator 130 may output the image data signal DATA, the data control signal DCS, the emission control signal ECS, and the scan control signal SCS so as to drive the first display region DA1 at the first driving frequency and the second display region DA2 at the second driving frequency.

The frequency mode determination part 120 of the driving controller 100 calculates the luminance difference between the image signal RGBk of the current frame and the image signal RGBk−1 of the previous frame stored in the memory 110 in the multi-frequency mode (S400). Each of the image signal RGBk of the current frame and the image signal RGBk−1 of the previous frame may have a certain gradation level. The driving controller 100 may calculate a luminance difference using a gradation level difference between the image signal RGBk of the current frame and the image signal RGBk−1 of the previous frame.

The frequency mode determination part 120 compares a first reference value with the luminance difference between the image signal RGBk of the current frame and the image signal RGBk−1 of the previous frame (S410).

If the luminance difference between the image signal RGBk of the current frame and the image signal RGBk−1 of the previous frame is less than the first reference value, the frequency mode determination part 120 maintains the operation mode as the multi-frequency mode.

If the luminance difference between the image signal RGBk of the current frame and the image signal RGBk−1 of the previous frame is equal to or greater than the first reference value, the frequency mode determination part 120 compares a second reference value with the luminance difference between the image signal RGBk of the current frame and the image signal RGBk−1 of the previous frame (S420).

If the luminance difference between the image signal RGBk of the current frame and the image signal RGBk−1 of the previous frame is less than the second reference value, the frequency mode determination part 120 determines whether the current frame is a frame in which an image is displayed only in the first display region DA1 (S430). For example, each of the second to 120$^{th}$ frames F2 to F120 illustrated in FIG. 3B may be a frame in which an image is displayed only in the first display region DAL

When the current frame is a frame in which an image is displayed only in the first display region DA1, the frequency mode determination part 120 changes the operation mode to a multi-frequency compensation mode, and outputs the mode signal MD corresponding to the multi-frequency compensation mode (S440).

In the multi-frequency mode, the compensator 131 of the signal generator 130 illustrated in FIG. 10 reads, from the lookup table 132, the compensation value CV corresponding to the gradation difference between the image signal RGBk of the current frame and the image signal RGBk−1 of the previous frame and adds the compensation value CV to the image signal RGBk of the current frame to output the image data signal DATA.

In the multi-frequency mode, the compensator 131 reads, from the lookup table 132, the compensation value CV corresponding to the gradation difference between the image signal RGBk of the current frame for the first display region DA1 and the image signal RGBk−1 of the previous frame for the first display region DA1.

In the multi-frequency compensation mode, the compensator 131 reads, from the lookup table 132, the compensation value CV corresponding to the gradation difference between the image signal RGBk of the current frame for both the first display region DA1 and the second display regions DA2 and the image signal RGBk−1 of the previous frame for both the first display region DA1 and the second display regions DA2, and adds the compensation value CV to the image signal RGBk of the current frame for the first display region DA1 to output the image data signal DATA.

In the multi-frequency compensation mode, a luminance change of the second display region DA2 may be minimized by compensating the image signal RGBk for the first display region DA1 in consideration of the image signal RGBk for the second display region DA2.

When the multi-frequency compensation mode for the current frame is completed, the multi-frequency mode is maintained again in a next frame.

If the luminance difference between the image signal RGBk of the current frame and the image signal RGBk−1 of the previous frame is equal to or greater than the second reference value, the frequency mode determination part 120 changes the operation mode to the normal mode and outputs the mode signal MD corresponding to the normal mode (S450).

The second reference value may be greater than the first reference value.

A display device having this configuration may operate in a multi-frequency mode in which a first display region is driven at a first driving frequency and a second display region is driven at a second driving frequency when a moving image is displayed in the first display region and a still image is displayed in the second display region. When the moving image displayed in the first display region causes a luminance change of the still image displayed in the second display region in the multi-frequency mode, the display device may terminate the multi-frequency mode or change the second driving frequency. Thus, a luminance change of the second display region may be minimized in the multi-frequency mode.

Although the embodiments of the present inventive concept have been described, it is understood that the present inventive concept should not be limited to these embodiments but various changes and modifications can be made by one ordinary skilled in the art within the spirit and scope of the present inventive concept as hereinafter claimed.

What is claimed is:

1. A display device comprising:
    a display panel comprising a first display region and a second display region, each of the first display region and the second display region including a plurality of pixels connected to a plurality of data lines and a plurality of scan lines;
    a data driving circuit which drives the plurality of data lines;
    a scan driving circuit which drives the plurality of scan lines; and
    a driving controller which controls the data driving circuit and the scan driving circuit to drive the first display region at a first driving frequency and the second display region at a second driving frequency lower than the first driving frequency when an operation mode is a multi-frequency mode,
    wherein the driving controller changes the operation mode from the multi-frequency mode to a normal-frequency mode, when a luminance difference between a current frame and a previous frame of the first display region is equal to or greater than a reference value, and
    wherein the driving controller controls the data driving circuit and the scan driving circuit to drive all of the first display region and the second display region at a normal frequency when the operation mode is the normal-frequency mode.

2. The display device of claim 1, wherein the luminance difference is a difference in luminance between an image signal of the current frame and an image signal of the previous frame.

3. The display device of claim 2, wherein the driving controller comprises:
a frequency mode determiner which determines the operation mode based on the image signal of the current frame, the image signal of the previous frame, and a control signal, and outputs a mode signal; and
a signal generator which outputs an image data signal to the data driving circuit, a data control signal to the data driving circuit and a scan control signal to the scan driving circuit corresponding to the mode signal.

4. The display device of claim 3, wherein the driving controller further comprises a memory which stores the image signal of the current frame and outputs the image signal of the previous frame.

5. The display device of claim 3, wherein the signal generator comprises:
a lookup table which stores a compensation value; and
a compensator which reads a compensation value corresponding to the difference between the image signal of the current frame and the image signal of the previous frame from the lookup table.

6. The display device of claim 5, wherein, when the mode signal indicates a normal mode, the compensator reads the compensation value corresponding to the difference between the image signal of the current frame corresponding to an entirety of the display panel and the image signal of the previous frame corresponding to the entirety of the display panel from the lookup table, and outputs the image data signal.

7. The display device of claim 5, wherein, when the mode signal indicates the multi-frequency mode and the current frame is a frame in which images are displayed both in the first display region and in the second display region, the compensator reads the compensation value corresponding to the difference between the image signal of the current frame corresponding to an entirety of the display panel and the image signal of the previous frame corresponding to the entirety of the display panel from the lookup table, and outputs the image data signal.

8. The display device of claim 5, wherein, when the mode signal indicates the multi-frequency mode and the current frame is a frame in which images are displayed only in the first display region, the compensator reads the compensation value corresponding to the difference between the image signal of the current frame corresponding to the first display region and the image signal of the previous frame corresponding to the first display region from the lookup table, and outputs the image data signal.

9. The display device of claim 1, wherein the first driving frequency is equal to or higher than the normal frequency and the second driving frequency is lower than the normal frequency.

10. A method of driving a display device, the method comprising:
driving a first display region at a first driving frequency and driving a second display region at a second driving frequency lower than the first driving frequency when an operation mode is a multi-frequency mode;
comparing a reference value with a luminance difference between a current frame and a previous frame of the first display region;
changing the operation mode from the multi-frequency mode to a normal-frequency mode, when a luminance difference between a current frame and a previous frame of the first display region is equal to or greater than the reference value; and
driving the first display region and the second display region at a normal frequency when the operation mode is the normal-frequency mode.

11. The method of claim 10, wherein the luminance difference is a difference in luminance between an image signal of the current frame and an image signal of the previous frame.

12. The method of claim 11, wherein the comparing the reference value with the luminance difference comprises:
comparing the difference in luminance with a first reference;
comparing the difference in luminance with a second reference value which is greater than the first reference value when the difference in luminance is equal to or greater than the first reference value;
setting the second driving frequency to a first frequency when the difference in luminance is equal to or greater than the first reference value and is less than a second reference value;
comparing the difference in luminance with a third reference value which is greater than the second reference value when the difference in luminance is equal to or greater than the second reference value; and
setting the second driving frequency to a second frequency higher than the first frequency when the difference in luminance is equal to or greater than the second reference value and is less than the third reference value which is greater than the second reference value.

13. The method of claim 12, wherein the changing the operation mode from the multi-frequency mode to the normal-frequency mode comprises:
changing the operation mode to the normal mode when the difference value is equal to or greater than third reference value.

14. The method of claim 10, wherein the first driving frequency is equal to or higher than the normal frequency and the second driving frequency is lower than the normal frequency.

15. A driving controller comprising:
a frequency mode determiner which determines an operation mode based on an image signal of a current frame, an image signal of a previous frame, and a control signal, and outputs a mode signal; and
a signal generator which outputs an image data signal, a data control signal and a scan control signal corresponding to the mode signal,
wherein the driving controller outputs the data control signal and the scan control signal to drive a first display region at a first driving frequency and a second display region at a second driving frequency lower than the first driving frequency when the operation mode is a multi-frequency mode, changes the operation mode from the multi-frequency mode to a normal-frequency mode when a luminance difference between the current frame and the previous frame of the first display region is equal to or greater than a reference value, and outputs the data control signal and the scan control signal to drive all of the first display region and the second display region at a normal frequency when the operation mode is the normal-frequency mode.

16. The driving controller of claim 15, wherein the driving controller further comprises a memory which stores the image signal of the current frame and outputs the image signal of the previous frame.

17. The driving controller of claim 15, wherein the signal generator comprises:
a lookup table which stores a compensation value; and a compensator which reads a compensation value corresponding to the luminance difference between the image signal of the current frame and the image signal of the previous frame from the lookup table.

18. The driving controller of claim 17, wherein the compensator receives the mode signal from the frequency mode determiner.

19. The driving controller of claim 15, wherein the driving controller calculates the luminance difference between the image signal of the current frame and the image signal of the previous frame.

20. The driving controller of claim 15, wherein the first driving frequency is equal to or higher than the normal frequency and the second driving frequency is lower than the normal frequency.

* * * * *